(12) United States Patent
Shi et al.

(10) Patent No.: US 8,239,753 B2
(45) Date of Patent: Aug. 7, 2012

(54) INFORMATION SHARING SUPPORT SYSTEM PROVIDING CORRABORATIVE ANNOTATION, INFORMATION PROCESSING DEVICE, COMPUTER READABLE RECORDING MEDIUM, AND COMPUTER CONTROLLING METHOD PROVIDING THE SAME

(75) Inventors: Meng Shi, Kanagawa (JP); Kiwame Tokai, Kanagawa (JP); Tsutomu Abe, Kanagawa (JP); Hiroyuki Miyake, Kanagawa (JP); Tetsuo Iyoda, Kanagawa (JP); Shoji Sakamoto, Kanagawa (JP); Jun Shingu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1350 days.

(21) Appl. No.: 11/861,331

(22) Filed: Sep. 26, 2007

(65) Prior Publication Data
US 2008/0222233 A1 Sep. 11, 2008

(30) Foreign Application Priority Data
Mar. 6, 2007 (JP) ................................. 2007-056091

(51) Int. Cl.
*G06F 17/00* (2006.01)

(52) U.S. Cl. .......................... 715/230; 715/232; 715/233

(58) Field of Classification Search .................. 715/209, 715/230, 232, 233
See application file for complete search history.

(56) References Cited

U.S. PATENT DOCUMENTS

| | | | | |
|---|---|---|---|---|
| 5,577,188 | A * | 11/1996 | Zhu ................................ | 715/745 |
| 6,342,906 | B1 * | 1/2002 | Kumar et al. .................. | 715/751 |
| 6,542,250 | B1 * | 4/2003 | Michaelis et al. ............. | 356/601 |
| 7,710,391 | B2 * | 5/2010 | Bell et al. ....................... | 345/156 |
| 2005/0088529 | A1 * | 4/2005 | Geng ........................ | 348/207.99 |
| 2005/0102609 | A1 * | 5/2005 | Izume et al. ................... | 715/512 |
| 2005/0110964 | A1 * | 5/2005 | Bell et al. ...................... | 353/122 |
| 2005/0122308 | A1 * | 6/2005 | Bell et al. ...................... | 345/156 |
| 2005/0162381 | A1 * | 7/2005 | Bell et al. ...................... | 345/156 |
| 2006/0061595 | A1 * | 3/2006 | Goede et al. .................. | 345/619 |
| 2006/0262336 | A1 * | 11/2006 | Venkatachalam et al. ... | 358/1.13 |
| 2006/0290786 | A1 * | 12/2006 | Tokai ........................ | 348/211.99 |
| 2007/0201863 | A1 * | 8/2007 | Wilson et al. .................. | 396/429 |
| 2007/0214407 | A1 * | 9/2007 | Bargeron et al. ............. | 715/512 |
| 2007/0258113 | A1 * | 11/2007 | Vau et al. ....................... | 358/452 |
| 2008/0028301 | A1 * | 1/2008 | Look et al. ..................... | 715/255 |
| 2008/0150890 | A1 * | 6/2008 | Bell et al. ...................... | 345/156 |

(Continued)

FOREIGN PATENT DOCUMENTS
JP 8-036546 A 2/1996
(Continued)

*Primary Examiner* — Thu Huynh
(74) *Attorney, Agent, or Firm* — Sughrue Mion, PLLC

(57) ABSTRACT

An information sharing support system is provided. The system includes a first information processing device connected to a projector device for projecting an image on a projection area, and to an image pick-up device for picking up an image of the projection area; an inputting unit that inputs an event in a first layer, inputs a second annotation image as a part of a first annotation image associated with the event to a second layer, inputs a third annotation image as the remaining part of the first annotation image to a third layer, and inputs a document to a fourth layer; a transmitting unit that transmits the second annotation image; and a second information processing device that allocates the picked-up image to the second layer, and includes a display that displays the third annotation image and the document in an overlapping fashion.

18 Claims, 16 Drawing Sheets

U.S. PATENT DOCUMENTS

| | | | |
|---|---|---|---|
| 2008/0150913 A1* | 6/2008 | Bell et al. | 345/175 |
| 2008/0246781 A1* | 10/2008 | Surati et al. | 345/690 |
| 2008/0288857 A1* | 11/2008 | Duncan et al. | 715/230 |
| 2009/0065138 A1* | 3/2009 | Engel et al. | 156/273.3 |
| 2009/0254867 A1* | 10/2009 | Farouki et al. | 715/853 |
| 2009/0307618 A1* | 12/2009 | Lawler et al. | 715/764 |
| 2010/0066675 A1* | 3/2010 | Wilson et al. | 345/158 |
| 2010/0191541 A1* | 7/2010 | Prokoski | 705/2 |

FOREIGN PATENT DOCUMENTS

| | | |
|---|---|---|
| JP | 10-269292 A | 10/1998 |
| JP | 2002-315065 A | 10/2002 |

* cited by examiner

ANNOTATION

MOVE

INFORMATION SHARING SUPPORT SYSTEM PROVIDING CORRABORATIVE ANNOTATION, INFORMATION PROCESSING DEVICE, COMPUTER READABLE RECORDING MEDIUM, AND COMPUTER CONTROLLING METHOD PROVIDING THE SAME

CROSS-REFERENCE TO RELATED APPLICATIONS

This application is based on and claims priority under 35 USC 119 from Japanese Patent Application No. 2007-056091 filed Mar. 6, 2007.

BACKGROUND

1. Technical Field

The present invention relates to an information sharing support system, an information processing device, a computer readable recording medium, and a computer controlling method.

2. Related Art

There have been known techniques for an information sharing support system that collectively manages electronic information as to actual objects such as a photo image of an object and a document.

SUMMARY

According to an aspect of the invention, there is provided an information sharing support system that includes: a first information processing device that is connected to a projector device for projecting an image on a projection area including an object therein, and to an image pick-up device for picking up an image of the projection area including the object, with the projected image being projected on the projection area; an inputting unit that inputs an event in a first layer, inputs a second annotation image that is a part of a first annotation image associated with the event to a second layer, inputs a third annotation image that is the remaining part of the first annotation image to a third layer, and inputs a document to a fourth layer; a transmitting unit that transmits the second annotation image to the projector device; a receiving unit that receives a picked-up image of the projection area from the image pick-up device, the picked-up image including the second annotation image projected on the projection area by the projector device; and a second information processing device that allocates the picked-up image received by the receiving unit to the second layer, and includes a display that displays the third annotation image of the third layer and the document of the fourth layer in an overlapping fashion.

BRIEF DESCRIPTION OF THE DRAWINGS

Exemplary embodiments of the present invention will be described in detail based on the following figures, wherein.

DETAILED DESCRIPTION

The following is a description of exemplary embodiments of the present invention, with reference to the accompanying drawings.

First Exemplary Embodiment

Figure 1:
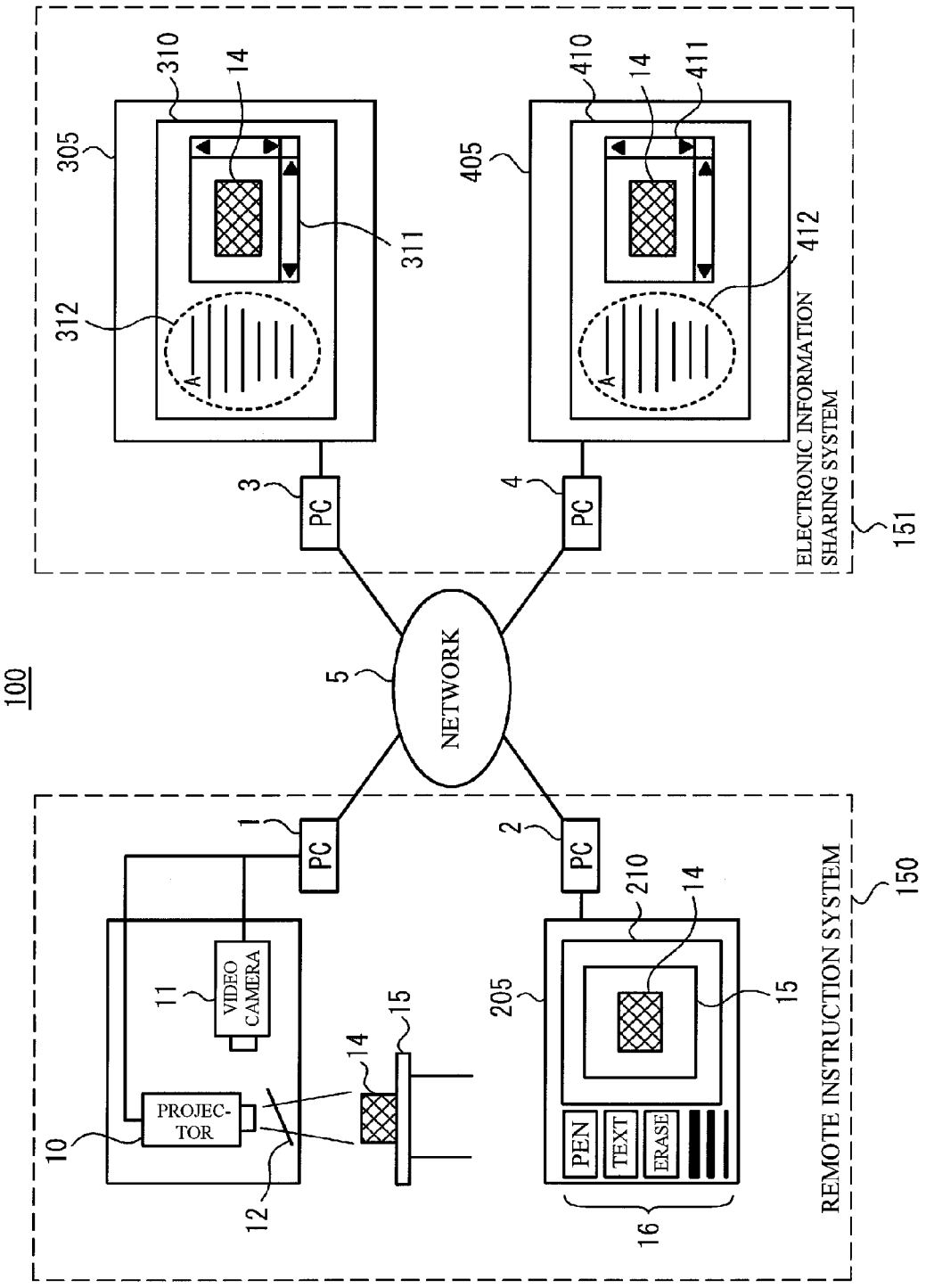
FIG. 1 is a block diagram showing the structure of an information sharing support system in accordance with a first exemplary embodiment of the present invention.

FIG. 1 is a block diagram showing the structure of an information sharing support system in accordance with a first embodiment of the present invention.

An information sharing support system 100 shown in FIG. 1 includes a remote instruction system 150 and an electronic information sharing system 151 that are connected to each other via a network 5.

The remote instruction system 150 includes a personal computer (PC) 1 (a first information processing apparatus, an external device) that functions as a server, and a PC 2 that functions as a client. The PC 1 and the PC 2 are connected to each other via the network 5. A projector 10 (a projector device) and a video camera 11 (an image pick-up device) are connected to the PC 1. In accordance with a control command from the PC 1, the projector 10 emits light beams or projects an annotation image or the like onto an object placed on a table 15 via a half mirror 12. The video camera 11 picks up the reflection image of the table 15 including an object 14 via the half mirror 12, and then outputs the picked-up image to the PC 1.

The PC 1 outputs the picked-up image to the PC 2 and to the electronic information sharing system 151 via the network 5. The PC 2 is connected to a display 205 that displays a display area 210 and a user interface (UI) 16. The PC 2 may be formed with a personal computer integrated with the display 205.

The UI 16 includes a pen button, a text button, an erase button, and the likes, and shows the types of line. In the display area 210, the image picked up by the video camera 11 is displayed. In FIG. 1, an image of the table 15 including the object 14 seen from the above is displayed in the display area 210. When the pen button on the UI 16 is pressed to display a drawing or the like on the object 14 in the display area 210, the information as to the drawing is output from the PC 2 to the projector 10 via the PC 1. Based on the information as to the drawing, the projector 10 draws a drawing on the object 14.

When a portion of the object 14 displayed in the display area 210 is selected, or a portion of the overall view of the object 14 is selected, a controller 201 (described later) of the PC 2 automatically creates at least one partially enlarged view of the object 1, and links the selected portion of the entire object 14 to the partially enlarged view with an annotation. The PC 2 transmits the information as the overall view linked to the partially enlarged view linked with an annotation to the projector 10, so that the overall view, the partially enlarged view, and the annotation connecting the two can be projected on the table 15.

The PC 2 outputs a control command to the PC 1, so as to control operations of the projector 10 and the video camera 11 (to control the image pick-up angle of the video camera 11 or the luminance of the projector 10, for example).

The electronic information sharing system 151 includes a PC 3 (a second information processing device) and a PC 4 that are connected to each other via the network 5. The PC 3 is connected to a display 305. A display area 310 of the display 305 includes a real view window 311 that displays all or a part of the image picked up by the video camera 11, and a document area 312 that displays characters, a drawing, or a sill image. The PC 3 receives the image picked up by the video camera 11 from the PC 1, and outputs the image to the real view window 311 of the display 305. The PC 4 is connected to a display 405. A display area 410 of the display 405 includes a real view window 411 that displays all or a part of the image picked up by the video camera 11, and a document area 412 that displays characters, a drawing, or a sill image. The PC 4 receives the image picked up by the video camera 11 from the PC 1, and outputs the image to the real view window 411 of the display 405. The real view windows 311 and 411 function as the layers forming data to be displayed in the display areas 310 and 410, as described later.

The PC 3 and the PC 4 share information with each other, and can simultaneously display the same information on the respective displays.

The PC3 and the PC 4 may also be formed with personal computers integrated with the displays 305 and 405, respectively.

Figure 2:
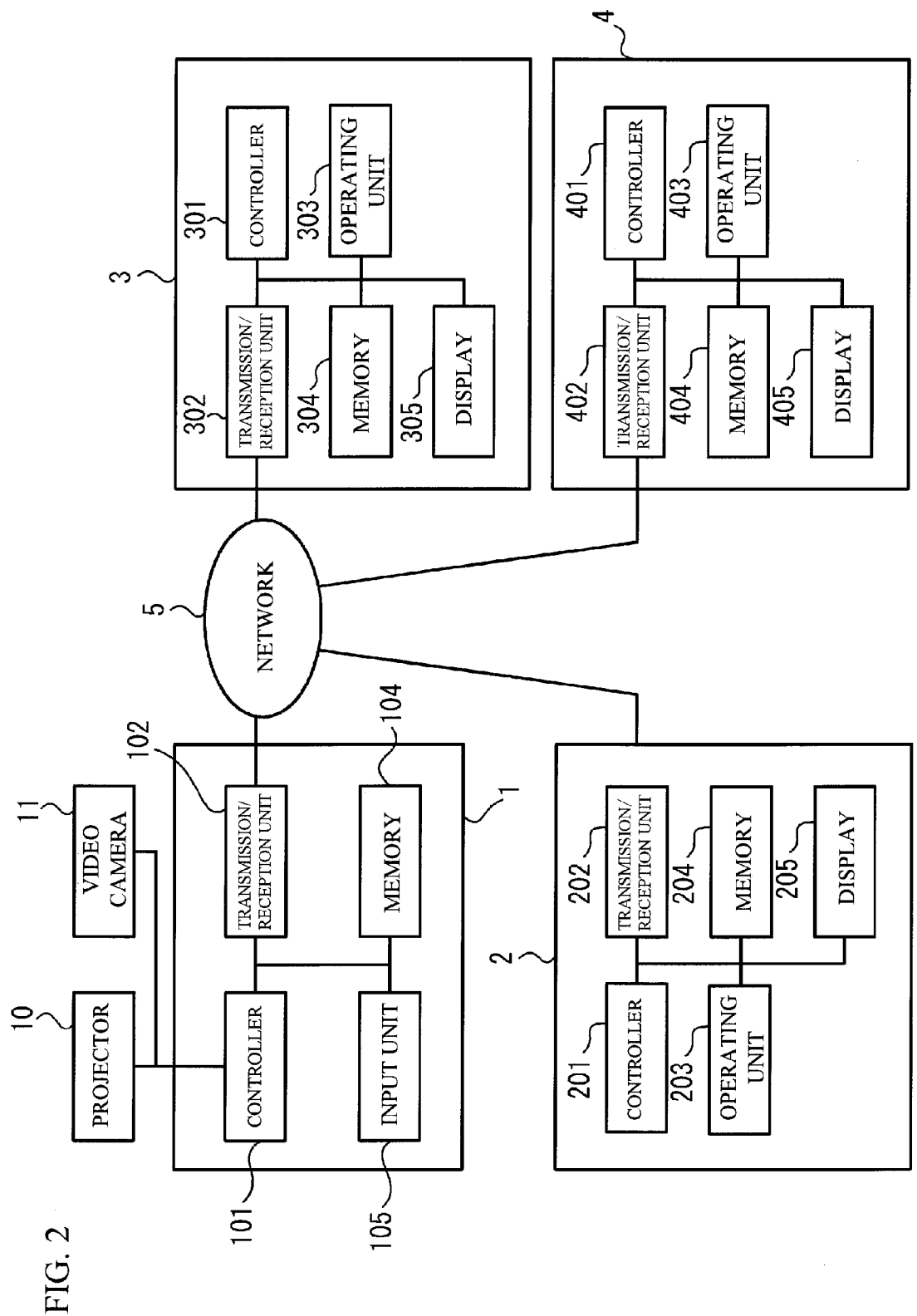
FIG. 2 shows the functional structures of PCs 1 through 4.

FIG. 2 illustrates the functional structures of the PCs 1 through 4.

The PC 1 includes a controller 101 (an output unit) that controls the operations of the projector 10 and the video camera 11 as well as the entire device, a transmission/reception unit 102 (an outputting unit) that exchanges information and data with other PCs via the network 5, a memory 104 that stores a control program and data and information, and an input unit 105 that is formed with a barcode reader or a RFID tag reader. The input unit 105 is used for reading a barcode attached to the object 14 or the identification information (such as an ID) as to the object 14 from a RFID tag. The controller 101 is connected to the projector 10, the video camera 11, the transmission/reception unit 102, the memory 104, and the input unit 105.

The PC 2 includes the controller 201 that controls the entire device, a transmission/reception unit 202 that exchanges information and data with other PCs via the network 5, an operating unit 203 that is formed with a mouse and a keyboard and the likes, a memory 204 that stores a control program and data and information, and the display 205. The controller 201 is connected to the transmission/reception unit 202, the operating unit 203, the memory 204, and the display 205.

As well as the PCs 1 and 2, the PCs 3 and 4 include controllers 301 and 401 (inputting units, transmitting units, receiving units, converting units, extracting units, matching units, connecting units, acquiring units, retrieving units, setting units, size matching units, attaching units), transmission/reception units 302 and 402 (transmitting units, receiving units, acquiring units), operating units 303 and 403 (inputting units, applying units), memories 304 and 404, and displays 305 and 405, respectively. The controller 301 is connected to the transmission/reception unit 302, the operating unit 303, the memory 304, and the display 305. The controller 401 is connected to the transmission/reception unit 402, the operating unit 403, the memory 404, and the display 405.

The PCs 1 through 4 are connected to one another via the respective transmission/reception units and the network 5.

Figure 3:
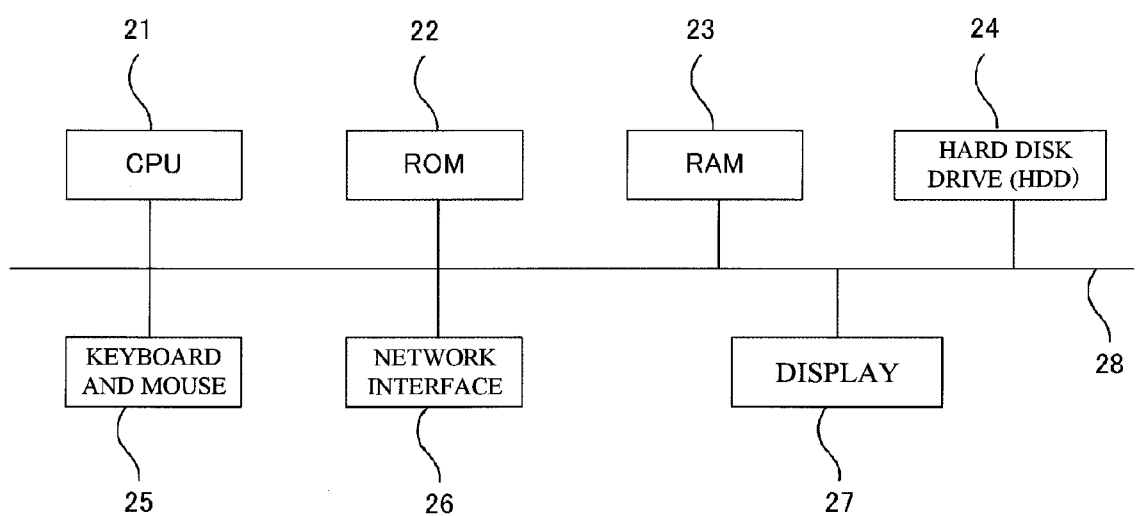
FIG. 3 is a block diagram showing the hardware structure of a PC 3.

FIG. 3 is a block diagram showing the hardware structure of the PC 3.

The PC 3 includes a CPU 21 that controls the entire device, a ROM 22 that stores the control program, a RAM 23 that functions as a work area, a hard disk drive (HDD) 24 that stores various kinds of information and programs, a mouse and keyboard 25, a network interface 26 that connects with other computers, and a display 27 that is formed with a liquid crystal monitor or a CRT. The CPU 21 is connected to the ROM 22, the RAM 23, the hard disk drive (HDD) 24, the mouse and keyboard 25, the network interface 26, and the display 27 via a system bus 28.

Since the PCs 2 and 4 each have the same structure as the PC 3, explanation of them is omitted here. The PC 1 has the same structure as the structure of the PC 3, except that the mouse and keyboard 25 and the display 27 are excluded, and a barcode reader or a RFID reader is included. However, the PC 1 may have the mouse and keyboard 25 and the display 27.

The controller 301 is equivalent to the CPU 21 that performs various operations according to the control program. The transmission/reception unit 302 is equivalent to the network interface 26. The operating unit 303 is equivalent to the mouse and keyboard 25. The memory 304 is equivalent to the hard disk drive (HDD) 24. The display 305 is equivalent to the display 27.

Figure 4:
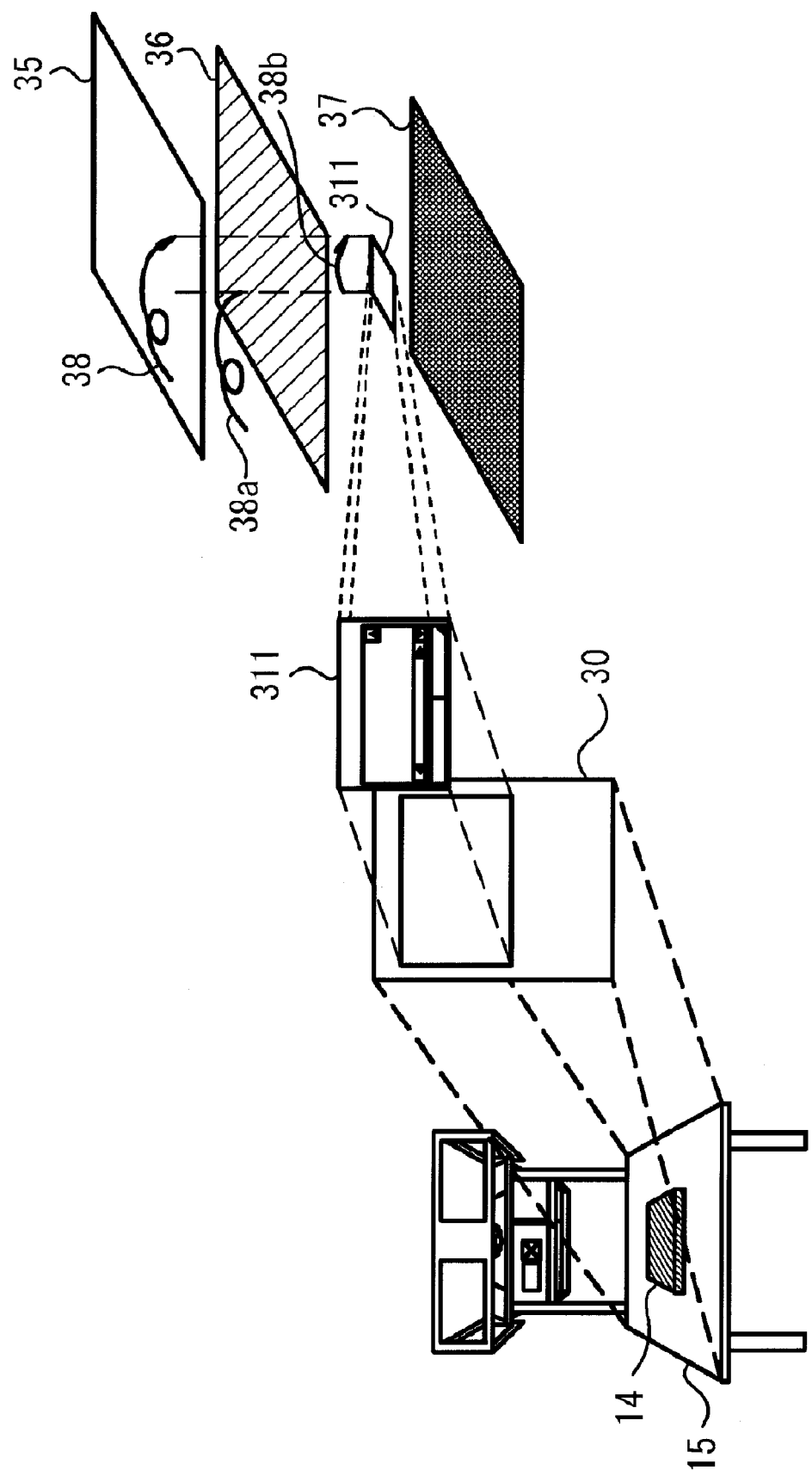
FIG. 4 schematically shows the structure of data to be displayed in the display area of a display.

FIG. 4 schematically shows the structure of data to be displayed in the display area 310 of the display 305.

The controller 301 of the PC 3 obtains a picked-up image 30 picked up by the video camera 11 from the PC 1 via the transmission/reception unit 302 and the network 5. The controller 301 then displays a part of the picked-up image 30 on the real view window 311 (a second layer) functioning as a layer. The size and location (a location in the display area 310) of the real view window 311 can be changed by operating the operating unit 303 (such as a mouse). The information as to the location of the image displayed on the real view window 311 in relation to the picked-up image 30, and the information as to the size of the image displayed on the real view window 311 are stored in the memory 304 by the controller 301. More specifically, the coordinate information as to the image displayed on the real view window 311, with the coordinate information as to the picked-up image 30 being the reference, and the information as to the image size determined by the coordinate information are stored in the memory 304 by the controller 301. The controller 301 can also change the scale of the image displayed on the real view window 311.

The controller 301 combines an event receiving window 35 (a first layer), a stroke drawing layer 36 (a third layer), the real view window 311, and a document image layer 37 (a fourth layer) with one another, so as to produce the data to be displayed in the display area 310 of the display 305. The controller 301 then outputs the data to the display 305. Although the event receiving window 35, the stroke drawing layer 36, and the document image layer 37 are normally designed to be transparent, the layers may be colored by operating the operating unit 303.

When an event to write an annotation or a document through the operating unit 303 occurs, the controller 301 inputs the event to the event receiving window 35. The event receiving window 35 receives the event. In FIG. 4, the event receiving window 35 receives the event of an annotation 38 (a first annotation image).

The controller 301 inputs the portion of the annotation written outside the range of the real view window 311, to the stroke drawing layer 36 through the operating unit 303. The portion of the annotation written outside the range of the real view window 311 is drawn on the stroke drawing layer 36. In FIG. 4, an annotation 38a (a third annotation image) that is a part of the annotation 38 and is written outside the range of the real view window 311 is drawn on the stroke drawing layer 36.

The controller 301 inputs the portion of the annotation written within the range of the real view window 311, to the real view window 311 through the operating unit 303. The portion of the annotation written within the range of the real view window 311 is drawn on the real view window 311, and a part of the picked-up image 30 is displayed on the real view window 311. In FIG. 4, an annotation 38b (a second annotation image) that is a part of the annotation 38 and is written within the range of the real view window 311 is drawn on the real view window 311.

As the annotation 38b is drawn on the real view window 311, the controller 301 transmits the coordinate information as to the location of the annotation 38b in the picked-up image 30, to the PC 1. The PC 1 uses the coordinate information and a control command to control the projector 10. The projector 10 projects the annotation 38b on the table 15 including the object 14. The controller 101 of the PC 1 converts the coordinate information as to the location of the annotation 38b in the picked-up image 30, into the coordinate information compatible with the projection area of the projector 10. The controller 101 then transmits the converted coordinate information as to the annotation 38 to the projector 10. In this manner, the annotation 38b in the picked-up image 30 is projected in an accurate position by the projector 10.

Alternatively, the controller 301 of the PC 3 may convert the coordinate information as to the location of the annotation 38b in the picked-up image 30, into the coordinate information compatible with the projection area of the projector 10. The controller 301 may then transmit the converted coordinate information as to the annotation 38b to the projector 10 via the PC 1.

The video camera 11 outputs a picked-up image of the table 15 including the object 14 onto which the annotation 38b is projected, to the controller 301 of the PC 3 via the PC 1 and the network 5 in a successive manner (every 0.5 seconds, for example). The controller 301 receives the picked-up image, and the annotation 38b is drawn on the real view window 311.

The controller 301 inputs a document to the document image layer 37 via the operating unit 303. The written document is drawn on the document image layer 37 via the operating unit 303.

As described above, the data to be displayed in the display area 310 of the display 305 has such a structure that the layers each capable of designating an annotation range are laid on one another. Thus, successive and transparent annotations are realized.

Figure 5:
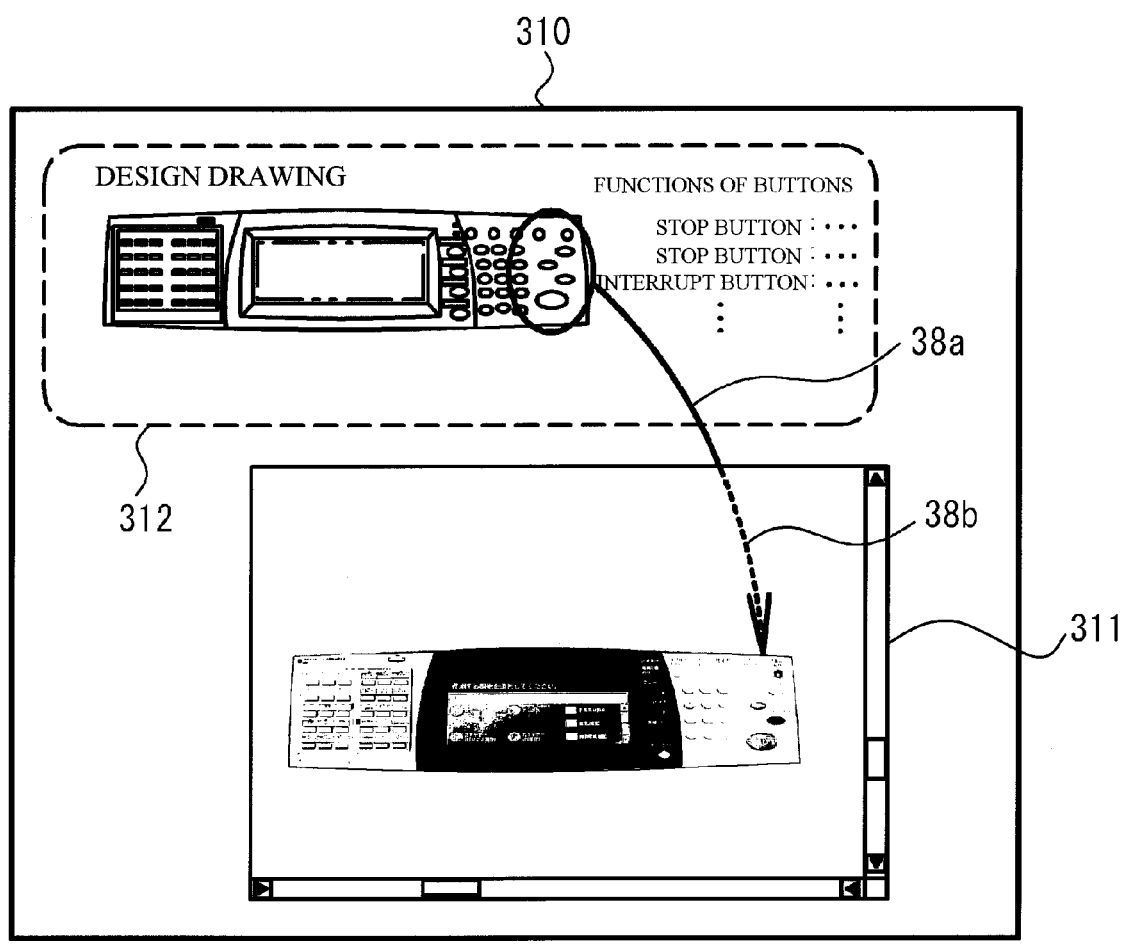
FIG. 5 shows an example of data that is actually displayed in the display area of the display.

FIG. 5 shows an example of the data actually displayed in the display area 310 of the display 305.

In FIG. 5, the design drawing of a complex machine, explanation of operating buttons of the complex machine, and the annotation 38a that is a part of the annotation 38 are shown in the document area 312. A picked-up image of the complex machine is displayed as an actual projection of the annotation 38b on the real view window 311.

Figure 6:
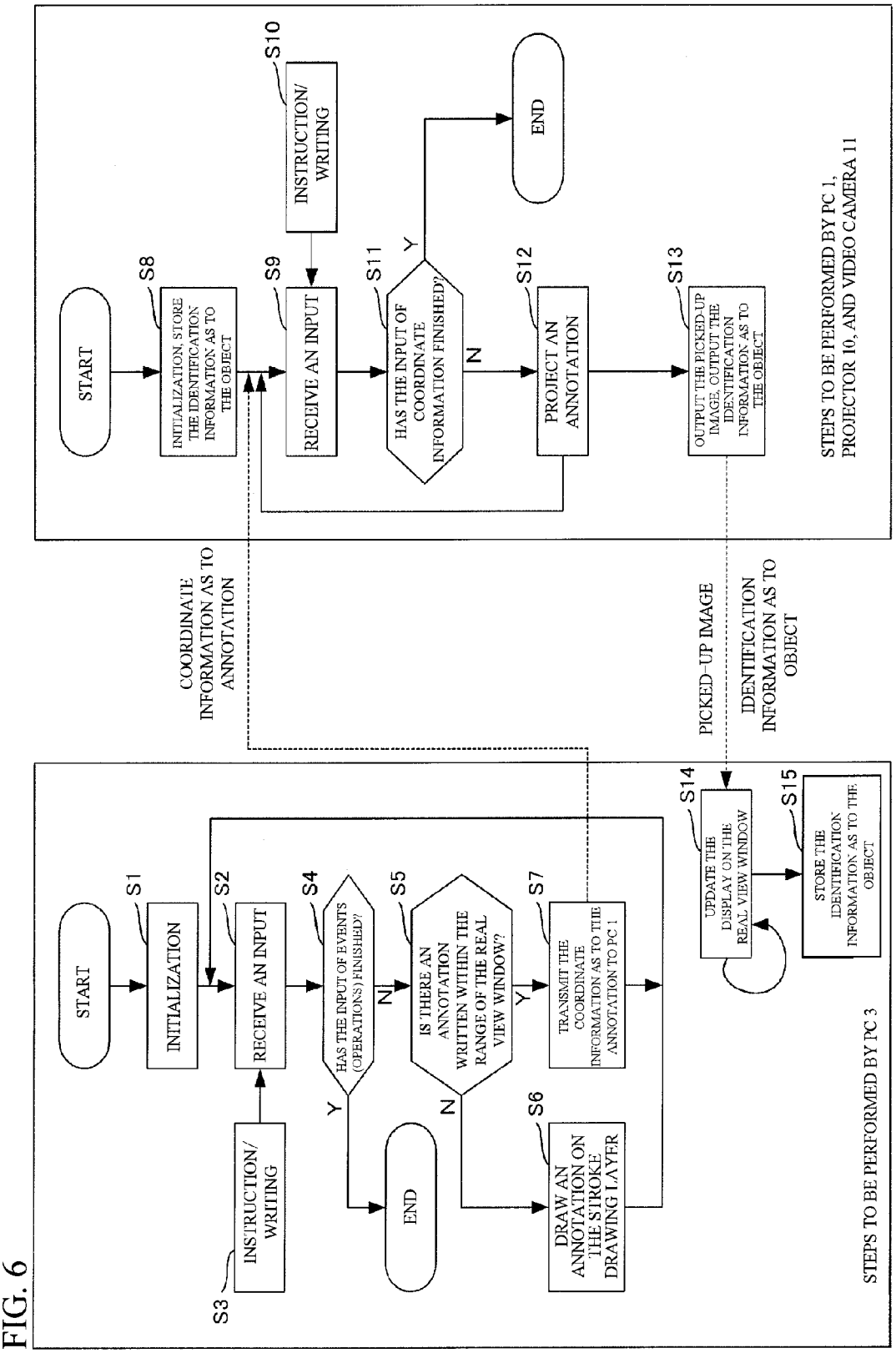
FIG. 6 is a flowchart showing the procedures for generating data to be displayed in the display area of the display.

FIG. 6 is a flowchart showing the steps to be performed for creating the data to be displayed in the display area 310 of the display 305.

First, the controller 301 of the PC 3 performs an initialization step (step S1). The initialization step includes the four procedures: (1) displaying the document image layer 37 on the entire screen (or displaying a document in the document area 312); (2) displaying the real view window 311; (3) displaying the stroke drawing layer 36 on the entire screen; and (4) displaying the event receiving window 35 on the entire screen.

The controller 301 receives an event (an operation) through the operating unit 303 (step S2). After the generation of the data starts, the controller 301 constantly receives an instruction or an event (an operation) such as writing through the operating unit 303 (step S3).

The controller 301 then determines whether the input of events (operations) through the operating unit 303 has finished (step S4). If the controller 301 determines that the input of events has finished ("YES" in step S4), the controller 301 ends the data generation. If the controller 301 determines that the input of events has not finished ("NO" in step S4), the controller 301 determines whether an annotation is written within the range of the real view window 311 (step S5). In a case where the coordinate information as to an annotation falls within the range defined by the coordinate information as to the four corners of the real view window 311, the controller 301 determines that the annotation is written within the range of the real view window 311.

If the controller 301 determines that the annotation is not written within the range of the real view window 311 ("NO" in step S5), the controller 301 draws the annotation on the stroke drawing layer 36 (step S6), and returns to step S2. In this manner, the stroke drawing layer 36 displays the annotation written outside the range of the real view window 311.

If the controller 301 determines that the annotation is written within the range of the real view window ("YES" in step S5), the controller 301 transmits the coordinate information as to the location of the annotation in the picked-up image 30, to the PC 1 via the transmission/reception unit 302 (step S7), and then returns to step S2.

Next, the steps to be performed by the PC 1, the projector 10, and the video camera 11 are described.

First, the controller 101 of the PC 1 performs an initialization step, and stores in the memory 104 the identification information (such as the ID) as to the object 14 read by the input unit 105 (step S8). Here, the initialization step includes the procedure for outputting a control command to the projector 10 and the video camera 11, the procedure for performing a projection by the projector 10, and the procedure for outputting an image picked up by the video camera 11. The procedures in step S8 are carried out independently of the procedures carried out on the PC 3 side.

The controller 101 then receives the coordinate information as to the location of the annotation in the picked-up image 30 from the PC 3 via the network 5 and the transmission/reception unit 102 (step S9). After the generation of the data starts, the controller 101 constantly receives an instruction or an event (an operation) such as writing from the PC 2 (step S10).

The controller 101 then determines whether the input of the coordinate information as to the location of the annotation in the picked-up image 30 has finished (step S11).

If the controller 101 determines that the input of the coordinate information has finished ("YES" in step S11), the controller 101 ends the data generation. If the controller 101 determines that the input of the coordinate information has not finished ("NO" in step S11), the controller 101 converts the coordinate information into coordinate information compatible with the projector 10. Using the converted coordinate information and a control command, the controller 101 controls the projector 10, so that the projector 10 projects an annotation according to the converted coordinate information on the table 15 including the object 14 (step S12). The video camera 11 outputs a picked-up image of the table 15 including the object 14 on which the annotation is projected, to the controller 301 of the PC 3 via the PC 1, the network 5, and the transmission/reception unit 302, while the controller 101 outputs the identification information as to the object 14 stored in the memory 104, to the controller 301 of the PC 3 (step S13).

The controller 301 receives the picked-up image, and updates the display on the real view window 311 (step S14). In this manner, an annotation is displayed, together with the table 15 including the object 14, on the real view window 311. The display updating in step S14 is performed in a successive manner. The controller 301 also obtains the identification information as to the object 14 from the PC 1, and stores the identification information in the memory 304 (step S15).

In this exemplary embodiment, the controller 301 may extract the feature points of the document (including characters, a drawing, or a sill image) written on the document image layer 37 and the picked-up image on the real view window 311. The controller 301 may then perform feature-point matching between the extracted feature points, and connect matching feature points to each other with an annotation. The portion of the annotation written outside the range of the real view window 311 is drawn on the stroke drawing layer 36, and the portion of the annotation written within the range of the real view window 311 is drawn on the real view window 311 through the projecting operation of the projector 10 and the image pick-up operation of the video camera 11 according to the flowchart shown in FIG. 6.

With this arrangement, the user who views the display 305 of the PC 3 can readily grasp the correspondence in the relationship between the actual object 14 displayed as an picked-up image and the subject document.

When receiving a picked-up image from the video camera 11, the controller 301 may obtain the attribute information as to the projector 10 and the video camera 11 from the PC 1, and store the attribute information in the memory 304. The attribute information includes the information as to the projecting position and the projection range of the projector 10, and the information as to the image picking position and the image pick-up range of the video camera 11.

When the controller 301 stores the data to be displayed in the display area 310 of the display 305 in the memory 304, an annotation (including coordinate information), a picked-up image within the real view window 311, and the main information as to the subject document are stored in the memory 304. At the same time, the attribute information (the positional information and range information) as to the real view window 311, the attribute information as to the document (including the document ID, the subject page number(s), the display range of the document, and the display position of the document), the attribute information as to the object (the identification information (ID) as to the object), and the attribute information as to the projector 10 and the video camera 11 (including the information as to the projecting position and the projection range of the projector 10, and the information as to the image picking position and the image pick-up range of the video camera 11) may be associated with the main information, and be stored in the memory 304.

With this arrangement, the controller 301 can retrieve the data to be displayed in the display area 310 of the display 305, based on the attribute information such as the identification information as to the object. The controller 301 can also perform a control operation so that the data stored in the memory 304 can be displayed in the display area 310 of the display 305.

As described above, in accordance with this exemplary embodiment, the controller 301 inputs the operation of drawing the annotation 38 to the event receiving window 35 via the operating unit 303, inputs the annotation 38b that is taken by the video camera 11 and is a part of the annotation 38 to the real view window 311, inputs the annotation 38a that is the remaining part of the annotation 38 to the stroke drawing layer 36, and inputs the subject document to the document image layer 37. The controller 301 then transmits the annotation 38b to the projector 10 via the transmission/reception unit 302, and receives a picked-up image of the projection area in which the annotation 38b is projected by the projector 10, from the video camera 11 via the transmission/reception unit 302. The display 305 allocates the picked-up image received by the controller 301 to the real view window 311, and displays the picked-up image, the annotation 38a of the stroke drawing layer 36, and the document of the document image layer 37 in an overlapping fashion.

Since the display 305 displays the real view window 311, the stroke drawing layer 36, and the document image layer 37 in an overlapping fashion, the annotation that connects the object and the document is displayed in a continuous and transparent manner, and the user of the PC 3 can readily grasp the correspondence in the relationship between the object and the document. Also, the continuous and transparent annotation 38 can be realized with the annotation 38b and the annotation 38a.

The controller 301 also transmits the coordinate information as to the annotation 38b in the picked-up image 30 to the controller 101 of the PC 1 via the transmission/reception unit 302. The controller 101 in turn converts the coordinate information as to the annotation 38b into the coordinate information compatible with the projection area of the projector 10, and transmits the converted coordinate information to the projector 10. Thus, the annotation 38b can be projected on an accurate location in the projection area including the object 14.

The controller 301 further extracts the feature points of the document drawn on the document image layer 37 and the picked-up image displayed on the real view window 311. The controller 301 then performs matching between the extracted feature points, and connects matching feature points to each other with an annotation. Thus, the user who views the display 305 of the PC 3 can readily grasp the correspondence in the relationship between the actual objected displayed as a picked-up image and the document.

The controller 301 further acquires the attribute information as to the object 14 and the attribute information as to the projector 10 and the video camera 11. The data to be displayed on the display 305, the attribute information as to the real view window 311, the attribute information as to the subject document, the attribute information as to the object, and the attribute information as to the projector 10 and the video camera 11 are associated with one another and are stored in the memory 304. Based on at least one piece of attribute information among the attribute information as to the real view window 311, the attribute information as to the document, the attribute information as to the object, and the attribute information as to the projector 10 and the video camera 11, the controller 301 retrieves the data to be displayed on the display 305. Thus, in accordance with the various kinds of attribute information, the data to be displayed on the display 305 can be retrieved.

Second Exemplary Embodiment

Next, a second exemplary embodiment of the present invention is described, with reference to the accompanying drawing.

In this exemplary embodiment, a document (such as a drawing) written in the document area 312 is dragged and dropped on the real view window 311, so that the projector 10 projects the document on the table 15 including the object 14.

Since the information sharing support system of this exemplary embodiment has the same structure as the above-described information sharing support system 100, explanation of the structure of the information sharing support system of this exemplary embodiment is omitted here.

Figure 7:
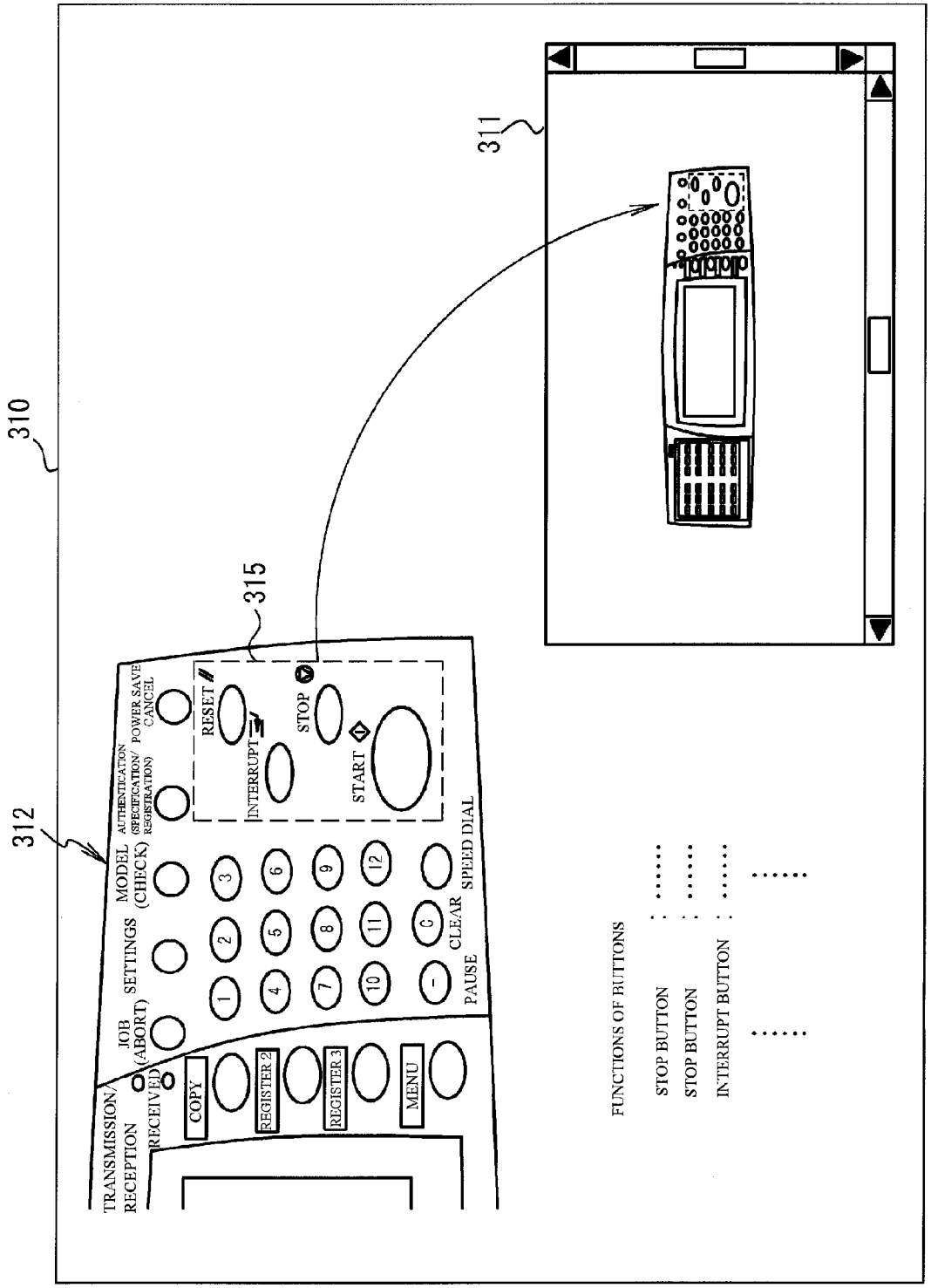
FIG. 7 shows an example of data that is displayed in the display area of a display in accordance with a second exemplary embodiment of the present invention.

FIG. 7 shows an example of the data displayed in the display area 310 of the display 305. In this example, the object 14 is the operation panel of a copying machine.

In FIG. 7, a view of a part of the operation panel of the copying machine and explanation of the buttons of the copying machine are displayed in the document area 312. A picked-up image of the operation panel of the copying machine is displayed on the real view window 311.

In the example shown in FIG. 7, a user can select a partial image 315 of the document (a view of a part of the operation panel of the copying machine) written in the document area 312 through the operating unit 303, and can drag and drop the selected partial image 315 on the real view window 311.

Figure 8:
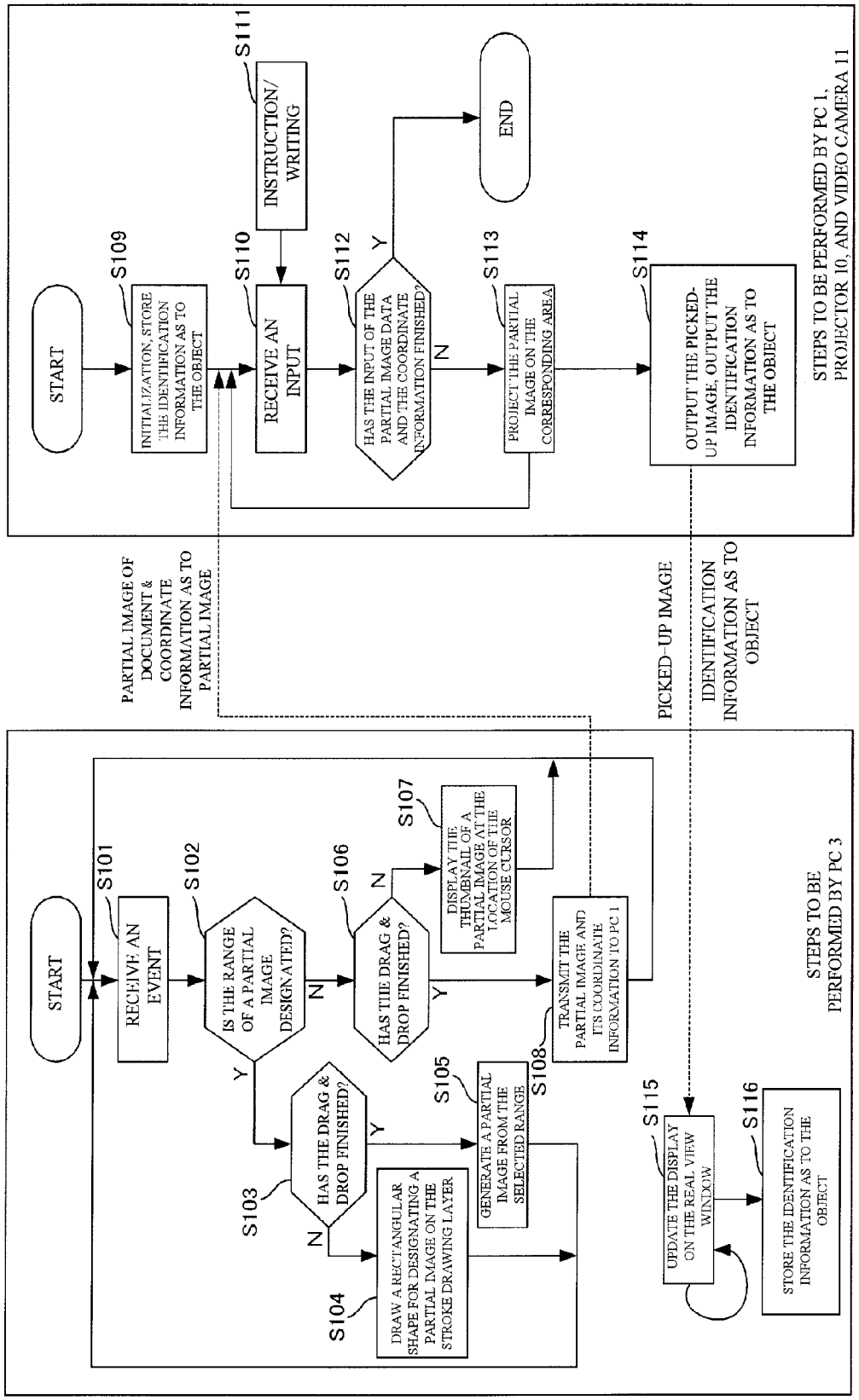
FIG. 8 is a flowchart showing the procedures for projecting a partial image in a document area onto a table including an object by a projector device.

FIG. 8 is a flowchart showing the procedures for projecting a partial image written in the document area 312 onto the table 15 including the object 14, using the projector 10.

First, the controller 301 receives an event from the operating unit 303 (step S101), and determines whether a designated region of a partial image is in the document area 312 (step S102). If there is not a designated region of a partial image in the document area 312 ("NO" in step S102), the controller 301 determines whether the drag and drop for drawing a rectangle to designate a partial image on the stroke drawing layer 36 has finished (step S103). The shape of the region for designating a partial image is not limited to a rectangular shape, but may be a circular shape of an oval shape, for example.

If the controller 301 determines that the drag and drop has not finished ("NO" in step S103), the controller 301 continues to draw the rectangle to designate a partial image on the stroke drawing layer 36 (step S104), and returns to step S102. If the controller 301 determines that the drag and drop has finished ("YES" in step S103), the controller 301 uses the document written on the document image layer 37 corresponding to the region selected with the rectangular, to produce a partial image (step S105), and then returns to step S102.

If there is a designated region of a partial image in the document area 312 ("YES" in step S102), the controller 301 determines whether the drag and drop of a partial image on the real view window 311 has finished (step S106). If the controller 301 determines that the drag and drop has not finished ("NO" in step S106), or if a partial image is still being dragged, the controller 301 displays a thumbnail of the partial image at the location of a mouse cursor that is not shown in FIG. 7 (step S107), and returns to step S102. If the controller 301 determines that the drag and drop has finished ("YES" in step S106), the controller 301 transmits the coordinate information as to the picked-up image 30 displayed on the real view window 311 having the data of the partial image and the partial image attached thereonto (or dropped thereon), to the PC 1 via the transmission/reception unit 302 and the network 5 (step S108), and returns to step S102.

Next, the steps to be performed by the PC 1, the projector 10, and the video camera 11 are described.

First, the controller 101 of the PC 1 performs an initialization step, and stores, in the memory 104, the identification information (such as an ID) as to the object 14 read by the input unit 105 (step S109). The procedures in the initialization step include outputting a control command to the projector 10 and the video camera 11, performing a projection by the projector 10, and outputting an image picked up by the video camera 11. The procedures in step S109 are carried out independently of the procedures to be carried out on the PC 3 side.

The controller 101 receives the coordinate information as to the picked-up image 30 on the real view window 311 having the data of the partial image and the partial image attached thereonto (or dropped thereon), from the PC 3 via the network 5 and the transmission/reception unit 102 (step S110). Once this operation starts, the controller 101 constantly receives an instruction or an event (an operation) such as writing from the PC 2 (step S111).

The controller 101 then determines whether the input of the data of the partial image and the coordinate information has finished (step S112).

If the controller 101 determines that the input of the data of the partial image and the coordinate information has finished ("YES" in step S112), the controller 101 ends this operation. If the controller 101 determines that the input has not finished ("NO" in step S112), the controller 101 converts the coordinate information as to the partial image into the coordinate information compatible with the projector 10. Using the converted information, the data of the partial image, and the control command, the controller 101 controls the projector 10, so that the projector 10 projects the partial image corresponding to the converted coordinate information onto the table 15 including the object 14 (step S113). The video camera 11 outputs a picked-up image of the table 15 including the object 14 having this partial image projected thereon, to the controller 301 of the PC 3 via the network 5 and the transmission/reception unit 302, while the controller 101 outputs the identification information as to the object 14 stored in the memory 104, to the controller 301 of the PC 3 (step S114).

The controller 301 receives this picked-up image, and updates the display on the real view window 311 (step S115). In this manner, the table 15 including the object 14 having the partial image projected thereon is displayed on the real view window 311. The display updating procedure in step S115 is carried out in a successive manner. The controller 301 also obtains the identification information as to the object 14 from the PC 1, and stores the identification information in the memory 304 (step S116).

Figure 9A:
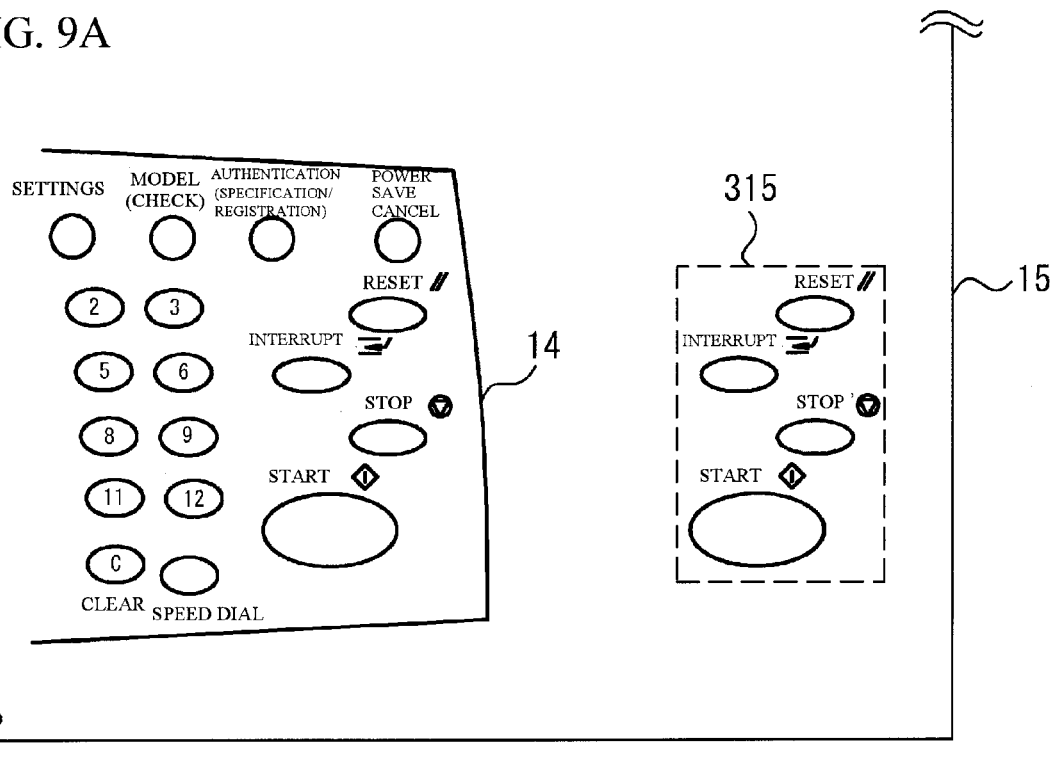
FIG. 9A is an example case where a partial image is projected so as not to overlap with the object.
Figure 9B:
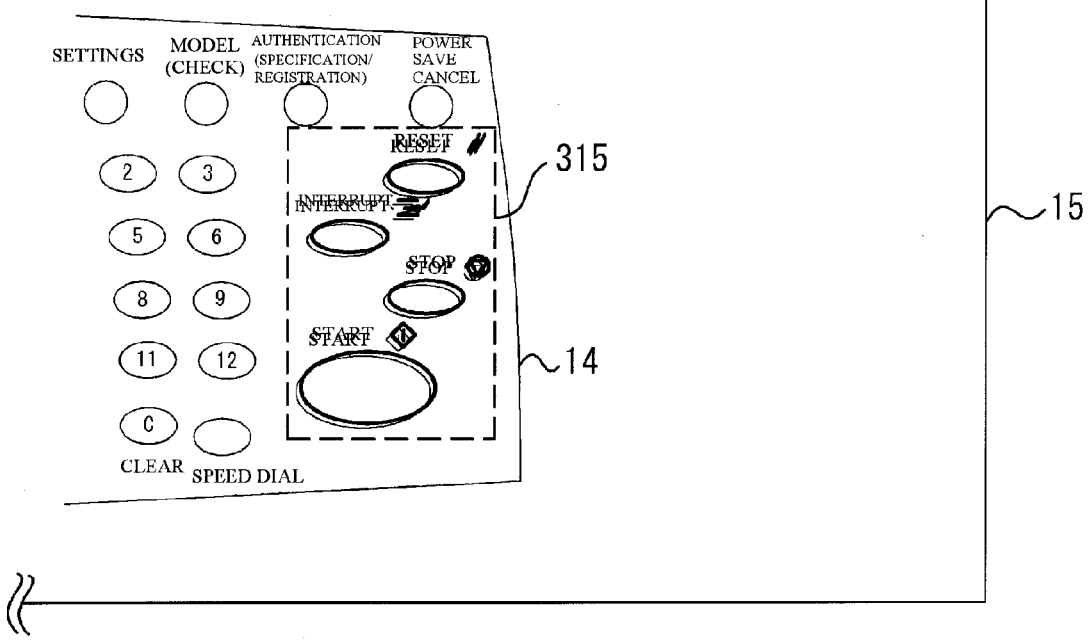
FIG. 9B is an example case where a partial image is projected so as to overlap with the object.

FIGS. 9A and 9B show examples of projections of the partial image 315 projected by the projector 10 onto the table 15 including the object 14 (the operation panel of a copying machine). FIG. 9A shows an example case where the partial image 315 is projected so as not to overlap with the object 14. FIG. 9B shows an example case where the partial image 315 is projected so as to overlap with the object 14.

Figure 10:
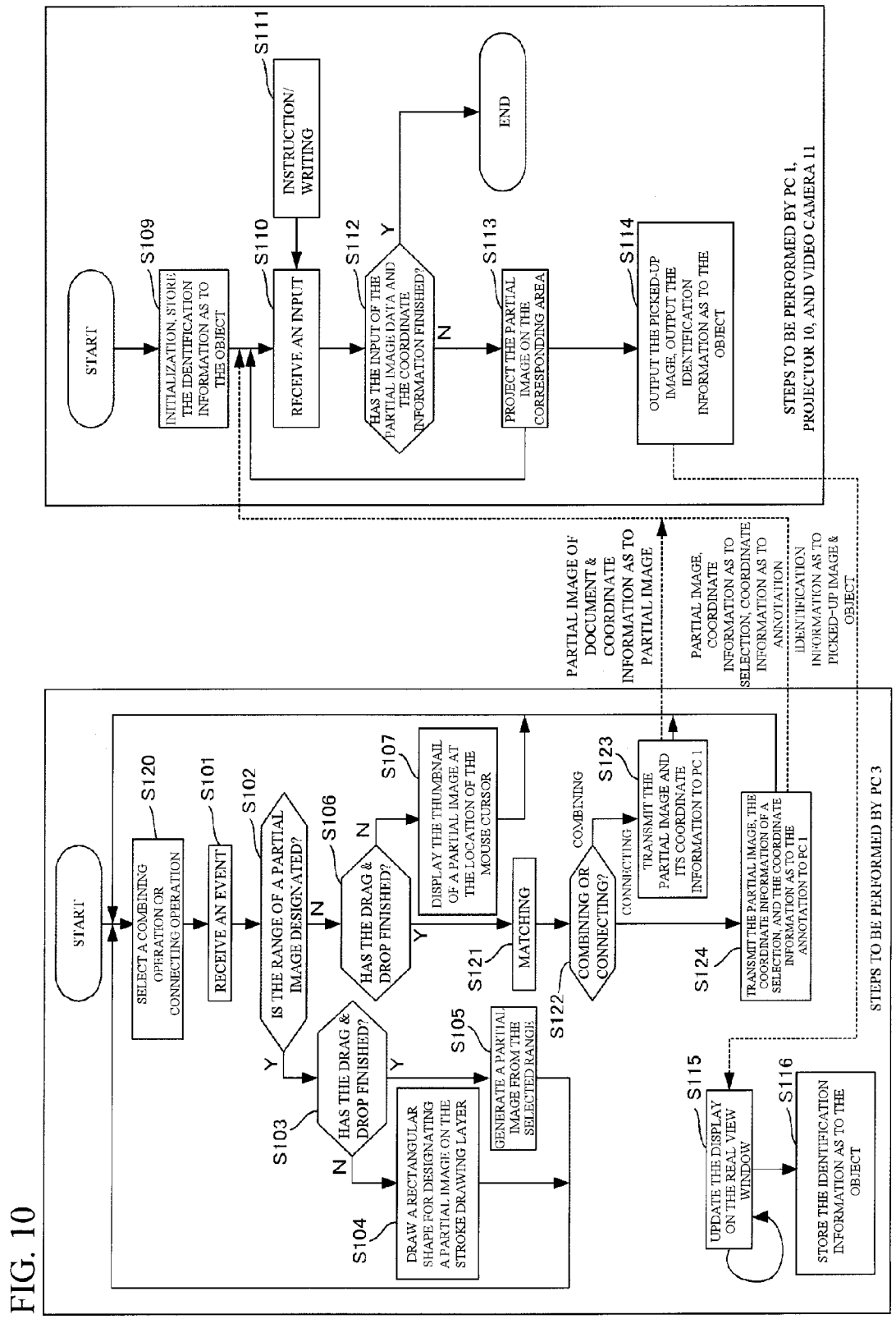
FIG. 10 is a flowchart showing a modification of the operation of FIG. 8.

FIG. 10 is a flowchart showing a modification of the operation shown in FIG. 8. The same steps as those in FIG. 8 are denoted by the same reference numerals, and explanation of them is omitted here.

First, in response to an input from a user through the operating unit 303, the controller 301 lays the partial image 315 on the corresponding portion of the picked-up image displayed on the real view window 311, or connects the partial image 315 (that is to be projected onto the table 15 including the object 14 by the projector 10) attached onto the real view window 311 to the corresponding portion of the picked-up image displayed on the real view window 311 with an annotation (step S120). After that, the controller 301 moves on to step S101.

If the result of the determination is "YES" in step S6, the controller 301 extracts the feature points of the partial image 351 attached onto the real view window 311 and the picked-up image on the real view window 311, and performs a matching operation between the extracted feature points (step S121).

The controller 301 then determines whether the procedure carried out in step S120 is the laying of the partial image 315 on the corresponding portion of the picked-up image or the connecting of the partial image 315 to the corresponding portion of the picked-up image (step S122).

If the procedure carried out in step S120 is the laying of the partial image 315 on the corresponding portion of the picked-up image, the controller 301 corrects the attachment position of the partial image 315, so that the feature points associated with each other as a result of the matching process overlap with each other. The controller 301 then transmits the coordinate information as to the picked-up image 30 on the real view window 311 onto which the data of the partial image and the partial image having the attachment position corrected are attached, to the PC 1 (step S123). After that, the controller 301 returns to step S102.

If the procedure carried out in step S120 is the connecting of the partial image 315 to the corresponding portion of the picked-up image, the controller 301 transmits the data of the partial image, the coordinate information that corresponds to the picked-up image 30 on the real view window 311 and is selected arbitrarily from a region not overlapping with the corresponding portion of the picked-up image (preferably the coordinate information corresponding to an empty region on the table 15), and the coordinate information as to the annotation that connects the partial image 315 to the corresponding portion of the picked-up image (the coordinate information as to the annotation that connects at least one pair of matching feature points), to the PC 1 (step S124). After that, the controller 301 returns to step S102.

If the procedure carried out in step S120 is the laying of the partial image 315 on the corresponding portion of the picked-up image, the same procedure as that in step S113 of FIG. 8 is carried out in step S113.

If the procedure carried out in step S120 is the connecting of the partial image 315 to the corresponding portion of the picked-up image, the controller 101 in step S113 converts the arbitrarily selected coordinate information into coordinate information compatible with the projector 10. Using the converted coordinate information, the partial image data, the coordinate information as to the annotation, and the control command, the controller 101 controls the projector 10, so that the projector 10 projects the partial image corresponding to the converted coordinate information and the annotation onto the table 15 including the object 14.

Figure 11A:
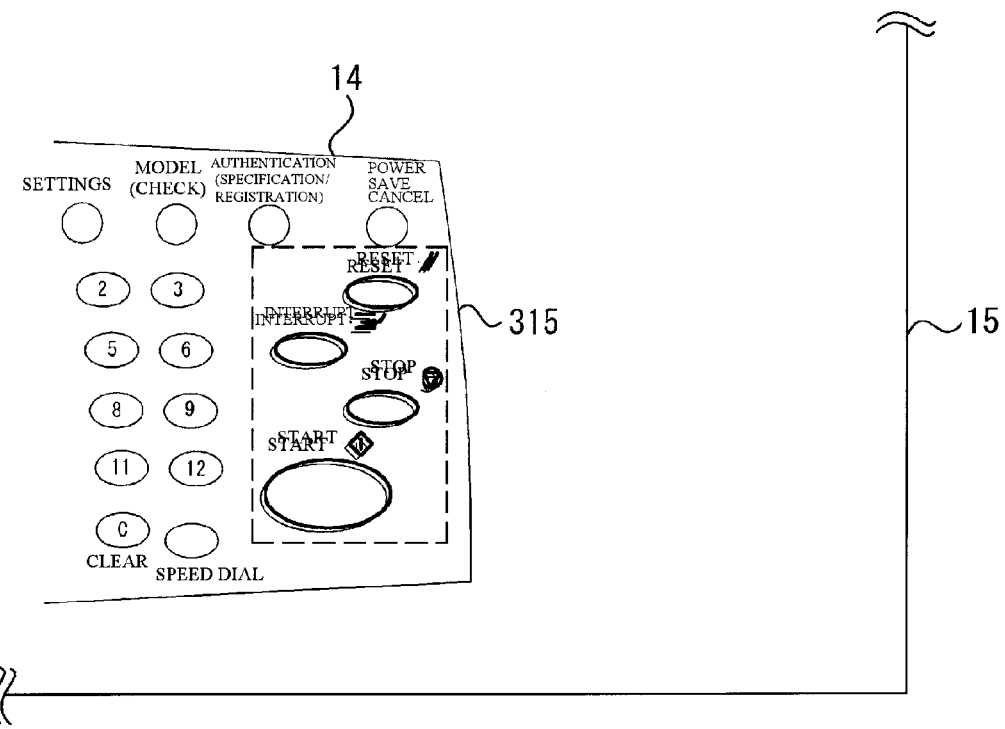
FIG. 11A is an example case where a partial image is projected so as to overlap with the object through a control operation performed to lay the partial image on the corresponding portion of a picked-up image.
Figure 11B:
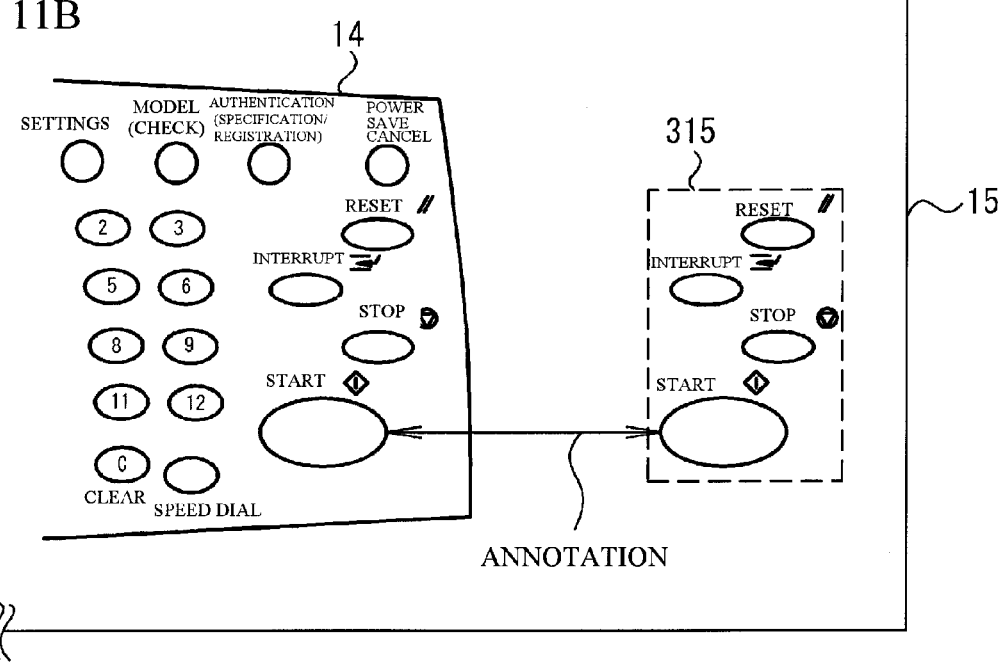
FIG. 11B is an example case where a partial image connected to the corresponding portion of the object with an annotation is projected through a control operation performed to connect the partial image to the corresponding portion of the picked-up image.

FIGS. 11A and 11B show examples of projections of the partial image 315 projected by the projector 10 onto the table 15 including the object 14 (the operation panel of a copying machine). FIG. 11A shows an example case where the partial image 315 is projected so as to overlap with the object 14 through the procedure for laying the partial image 315 on the corresponding portion of the picked-up image. FIG. 11B shows an example case where the partial image 315 connected to the corresponding portion of the picked-up image with an annotation is projected as a result of the procedure carried out to connect the partial image 315 to the corresponding portion of the picked-up image.

In this exemplary embodiment, upon receipt of a picked-up image from the video camera 11, the controller 301 may obtain the attribute information as to the projector 10 and the video camera 11 from the PC 1, and store the attribute information in the memory 304. Here, the attribute information includes the information as to the projecting position and the projection range of the projector 10, and the information as to the image picking position and the image pick-up range of the video camera 11.

When the controller 301 stores the data to be displayed in the display area 310 of the display 305 in the memory 304, a partial image (including coordinate information), an annotation (including coordinate information), a picked-up image within the real view window 311, and the main information as to the subject document are stored in the memory 304. At the same time, the attribute information (the positional information and range information) as to the real view window 311, the attribute information as to the document (including the document ID, the subject page number(s), the display range of the document, and the display position of the document), the attribute information as to the object (the identification information (ID) as to the object), and the attribute information as to the projector 10 and the video camera 11 (including the information as to the projecting position and the projection range of the projector 10, and the information as to the image picking position and the image pick-up range of the video camera 11) may be associated with the main information, and be stored in the memory 304.

With this arrangement, the controller 301 can retrieve the data to be displayed in the display area 310 of the display 305, based on the attribute information such as the identification information as to the object. The controller 301 can also perform a control operation so that the data stored in the memory 304 can be displayed in the display area 310 of the display 305.

As described above, in accordance with this exemplary embodiment, the controller 301 inputs the operation of drawing the annotation 38 to the event receiving window 35 via the operating unit 303, inputs the annotation 38b that is taken by the video camera 11 and is a part of the annotation 38 to the real view window 311, inputs the annotation 38a that is the remaining part of the annotation 38 to the stroke drawing layer 36, and inputs the subject document to the document image layer 37. The controller 301 selects a part of the document as a partial image, and attaches the partial image to the real view window 311. The controller 301 then transmits the partial image and the coordinate information as to the partial image to the projector 10 via the transmission/reception unit 302. Based on the coordinate information as to the partial image, the projector 10 projects a partial image on the projection area including the object 14.

Accordingly, a user near the projection area can view the partial image, and recognize the correspondence in the relationship between the object 14 and the document. Particularly, in a case where the partial image is attached to the real view window 311 so as to overlap with the object 14, the user in the vicinity of the projection area can recognize the difference between the partial image and the object 14. Meanwhile, the user of the PC 3 views the picked-up image displayed on the real view window 311, and can determine the point on which the partial image (a part of the document) is to be projected, while taking into consideration the position and the likes of the object 14.

Here, the partial image may not be a picture image or the like that can be visually rendered, but may be multimedia information such as audio or video information.

The controller 301 also receives a picked-up image of the projection area on which the partial image is projected by the projector 10, from the video camera 11 via the transmission/reception unit 302. The display 305 allocates the picked-up image received by the controller 301 to the real view window 311, and displays the picked-up image, the annotation 38a of the stroke drawing layer 36, and the document of the document image layer 37 in an overlapping fashion. Accordingly, the user of the PC 3 can check how the partial image is projected on the projection area including the object 14.

The controller 301 extracts the feature points of the partial image and the picked-up image displayed on the real view window 311. The controller 301 then performs matching between the extracted feature points, and corrects the position of the partial image so that the matching feature points can overlap with each other. In this manner, the partial image can be laid on the corresponding portion of the picked-up image with high precision. As a result, the user on the side of the projection area can view the partial image and the object 14 in an overlapping fashion, and can readily recognize the difference between the partial image and the object 14.

The controller 301 also extracts the feature points of the partial image and the picked-up image displayed on the real view window 311. The controller 301 performs matching between the extracted feature points, and connects matching feature points to each other with an annotation. The controller 301 then transmits the partial image, the coordinate information as to the partial image, and the coordinate information as to the annotation, to the projector 10 via the transmission/reception unit 302. Based on the coordinate information as to the partial image and the annotation, the projector 10 projects the partial image and the annotation on the projection area including the object 14. Accordingly, the user on the side of the projection area can readily grasp the correspondence in the relationship between the actual object and the document. Here, the matching may not be performed by the above-described method of this exemplary embodiment, but may be performed by a known matching method such as the SIFT method.

Third Exemplary Embodiment

Next, a third exemplary embodiment of the present invention is described, with reference to the accompanying drawings.

In this exemplary embodiment, it is possible to put the real view window 311 into a visible or invisible state. With the use of the information written in the display area 210 of the display 205 or the pen of the UI 16 of the PC 2, the information written on the object 14 or the table 15 is directly reflected on the stroke drawing layer 36 of the PC 3.

Since the information sharing support system of this exemplary embodiment has the same structure as the above-described information sharing support system 100, explanation of the structure of the information sharing support system of this exemplary embodiment is omitted here.

Figure 12:
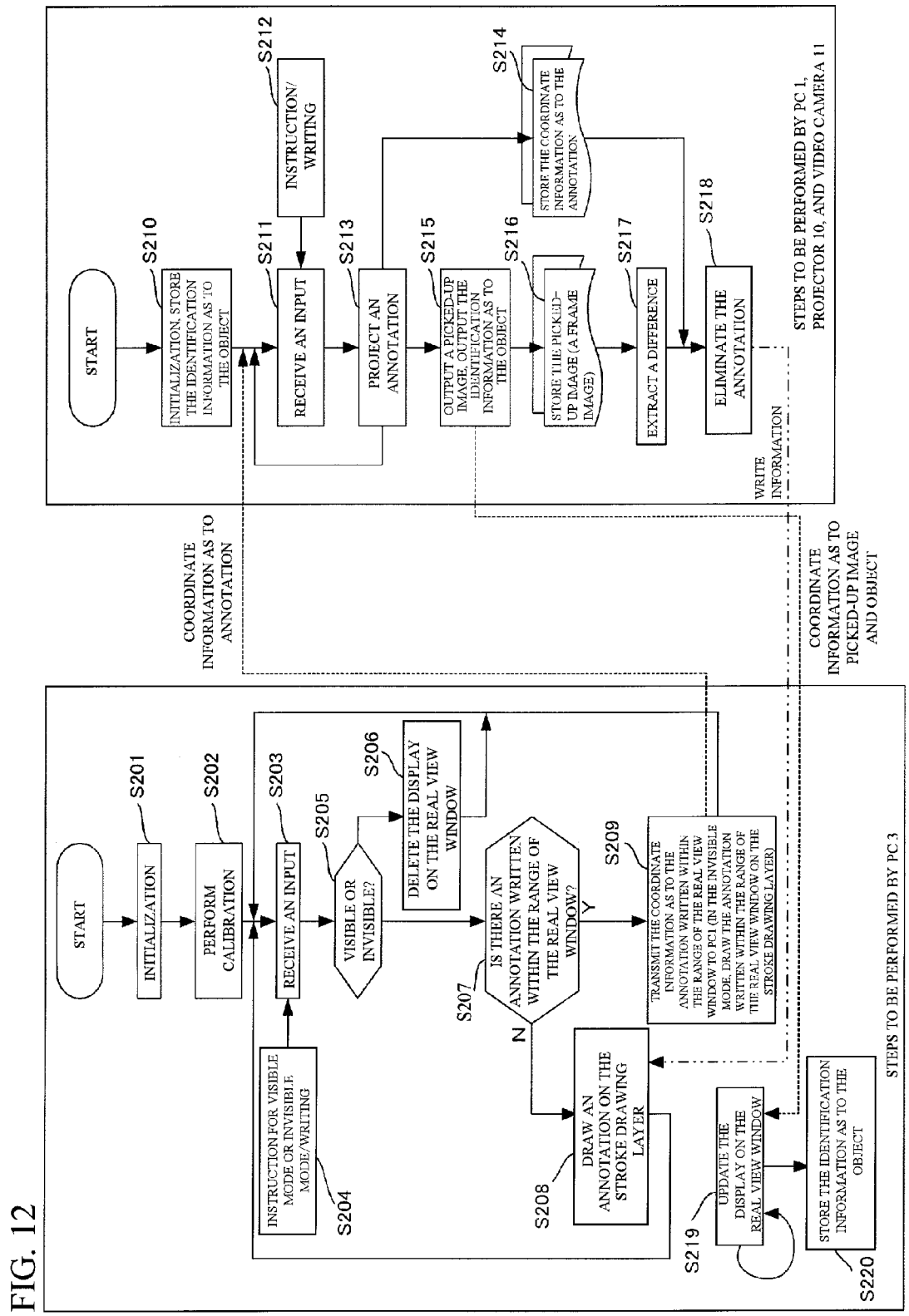
FIG. 12 is a flowchart showing the procedures for generating data to be displayed in the display area of a display in accordance with a third exemplary embodiment of the present invention.

FIG. 12 is a flowchart showing the steps to be performed for creating the data to be displayed in the display area 310 of the display 305.

First, the controller 301 of the PC 3 performs an initialization step (step S201). The initialization step includes the four procedures: (1) displaying the document image layer 37 on the entire screen (or displaying the subject document in the document area 312); (2) displaying the real view window 311; (3) displaying the stroke drawing layer 36 on the entire screen; and (4) displaying the event receiving window 35 on the entire screen.

The controller 301 then performs calibration of the real view window 311 (step S202). Here, to perform calibration of the real view window 311 is to uniform the scale of the data displayed on the real view window 311 and the scale of the document (such as a drawing) written in the document area 312, and to place the real view window 311 at the corresponding location on the document (such as a drawing) written in the document area 312. With this arrangement, the data displayed on the real view window 311 can have continuity with the document (such as a drawing) written in the document area 312.

After the calibration is performed, the image pick-up area of the table 15 including the object 14 becomes equal to the display area 310 in size.

Figure 13:
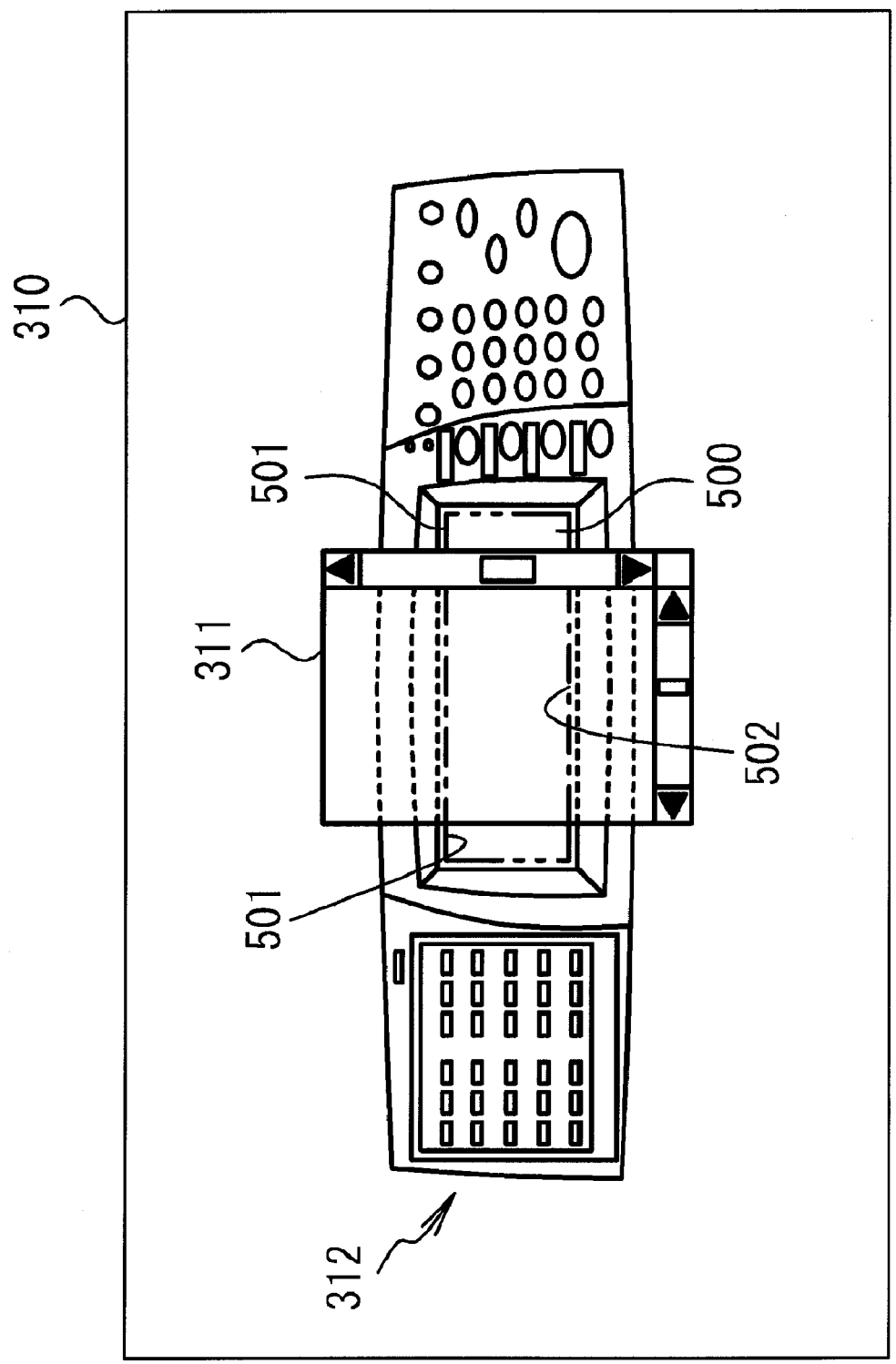
FIG. 13 shows an example of the display area after calibration is performed.

FIG. 13 shows an example of the display area 310 after the calibration. In this example, a view of the operation panel of a copying machine is written in the document area 312, and the real view window 311 is placed in a position overlapping with a display 500 of the copying machine.

In this case, the object 14 is the actual operation panel of the copying machine or a design drawing of the operation panel. An image of the object 14 picked up by the video camera 11 is displayed on the real view window 311 on the same scale as the drawing of the operation panel of the copying machine written in the document area 312. As shown in FIG. 13, when a rectangular annotation is drawn along the outer periphery of the display 500 of the copying machine through the operating unit 303, an annotation 501 is drawn on the stroke drawing layer 36, and an annotation 502 is displayed on the real view window 311.

Figure 14A:
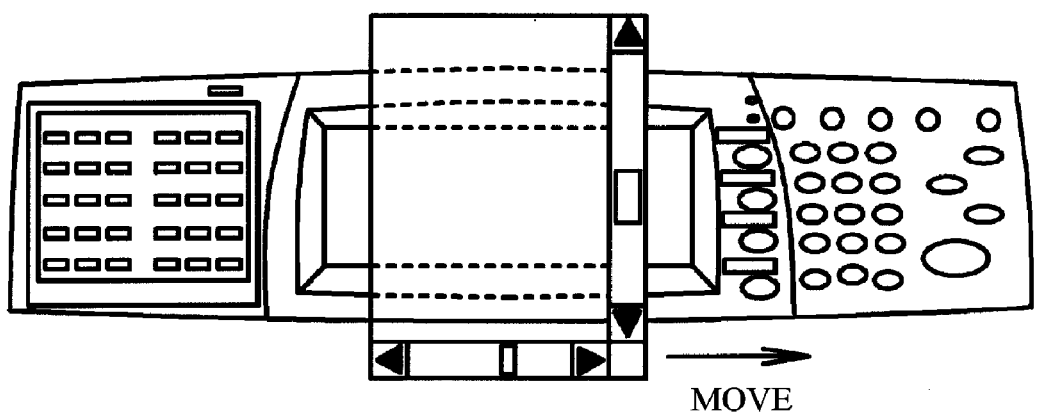
FIG. 14A shows the positional relationship between a drawing of the operation panel of a copying machine and the real view window before movement.
Figure 14B:
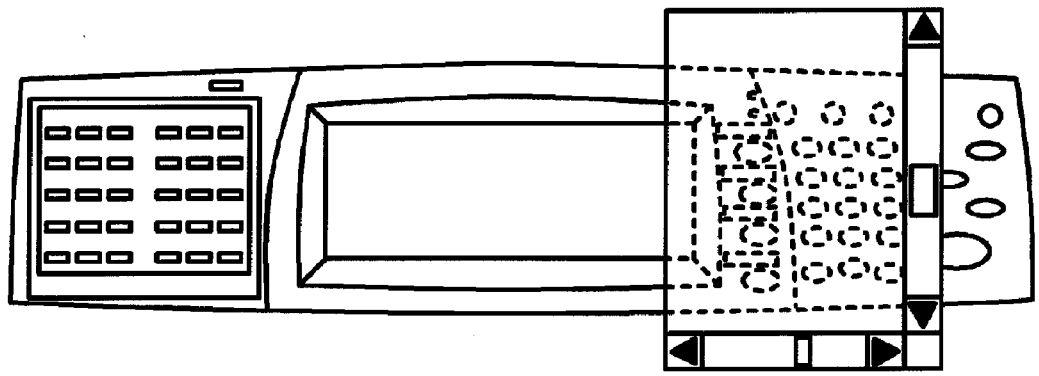
FIG. 14B shows the positional relationship between the drawing of the operation panel of the copying machine and the real view window after the movement.

FIG. 14A shows the positional relationship between the drawing of the operation panel of the copying machine and the real view window 311 before movement. FIG. 14B shows the positional relationship between the drawing of the operation panel of the copying machine and the real view window 311 after movement.

The controller 301 performs calibration of the real view window 311, and the drawing of the operation panel of the copying machine and the data within the real view window 311 are displayed on the same scales. Accordingly, when the real view window 311 is moved as shown in FIGS. 14A and 14B, the controller 301 changes the coordinate information as to the real view window 311 in the picked-up image 30, depending on the distance the real view window 311 has been moved.

For example, in a (x, y) coordinate system, the region of the picked-up image 30 is represented by (0, 0), (800, 0), (0, 640), and (800, 640). The coordinate information as to the real view window 311 before movement is (400, 200), (500, 200), (400, 400), and (500, 400). When the real view window 311 is moved by 100 in the x-direction, the controller 301 changes the coordinate information as to the real view window 311 to (500, 200), (600, 200), (500, 400), and (600, 400) after the movement. Accordingly, an image picked up at the destination point is displayed on the real view window 311.

Referring back to FIG. 12, the controller 301 receives an input of an event (an operation) through the operating unit 303 (step S203). After the generation of the data starts, the controller 301 constantly receives an instruction to put the real view window 311 into a visible or invisible state, and an event (an operation) such as writing (step S204).

The controller 301 determines whether an instruction to put the real view window 311 into a visible or invisible state has been input through the operating unit 303 (step S205).

If the controller 301 determines in step S205 that an instruction to put the real view window 311 into a visible state has been input through the operating unit 303, the controller 301 moves on to step S207. If the controller 301 determines in step S205 that an instruction to put the real view window 311 into an invisible state has been input through the operating unit 303, the controller 301 deletes the image displayed on the real view window (step S206), and moves on to step S207. More specifically, the controller 301 puts the layer of the real view window 311 into a non-display state.

In step S207, the controller 301 determines whether an annotation has been written within the range of the real view window 311. More specifically, the controller 301 determines that an annotation has been written in the range of the real view window 311, if the coordinate information as to the annotation is within a region defined by the coordinate information as to the four corners of the real view window 311.

If the result of the determination in step S207 is "NO", the controller 301 draws an annotation on the stroke drawing layer 36 (step S208), and returns to step S203. Accordingly the stroke drawing layer 36 displays an annotation that is written outside the real view window 311.

If the result of the determination in step S207 is "YES", the controller 301 transmits the coordinate information as to the annotation written within the range of the real view window 311 with respect to the picked-up image 30, to the PC 1 (step S209). After that, the controller 301 returns to step S203. If the real view window 311 is invisible, the annotation written within the range of the real view window 311 is also drawn on the stroke drawing layer 36 in step S209.

Next, the steps to be performed by the PC 1, the projector 10, and the video camera 11 are described.

First, the controller 101 of the PC 1 performs an initialization step, and stores in the memory 104 the identification information (such as an ID) as to the object 14 read by the input unit 105 (step S210). Here, the procedures in the initialization step include outputting a control command to the projector 10 and the video camera 11, performing a projection by the projector 10, and outputting an image picked up by the video camera 11. The procedures in step S210 are carried out independently of the procedures carried out on the PC 3 side.

The controller 101 then receives an input of the coordinate information as to the annotation on the picked-up image 30, from the PC 3 via the network 5 and the transmission/reception unit 102 (step S211). Once the generation of the data starts, the controller 101 constantly receives an instruction or an event (an operation) such as writing from the PC 2 (step S212).

The controller 101 then converts the coordinate information into coordinate information compatible with the projector 10, and controls the projector 10, using the converted coordinate information and the control command. The projector 10 projects an annotation according to the converted coordinate information on the table 15 including the object 14 (step S213). The video camera 11 picks up an image of the table 15 including the object 14 on which the annotation is projected, and outputs the picked-up image to the controller 301 of the PC 3 via the PC 1, the network 5, and the transmission/reception unit 302. The controller 101 outputs the identification information as to the object 14 stored in the memory 104, to the controller 301 of the PC 3 (step S215).

The controller 301 receives the picked-up image, and updates the display on the real view window 311 (step S219). Accordingly, the real view window 311 displays the annotation, together with the table 15 including the object 14. The updating of the display in step S219 is performed in a successive manner. The controller 301 also obtains the identification information as to the object 14 from the PC 1, and stores the identification information in the memory 304 (step S220).

The controller 101 stores the coordinate information as to the annotation on the picked-up image in the memory 104 (step S214). The coordinate information stored here is received in step S211. The controller 101 also stores a picked-up image (a frame image) in the memory 104 (step S216). The picked-up image stored here is output to the controller 301 in step S215. The storing of the coordinate information as to the annotation in step S214 and the storing of the picked-up image in step S216 are carried out at regular intervals (every 0.5 seconds, for example).

The controller 101 then extracts the difference between the consecutive picked-up images stored in the memory 104 (step S217). Based on the coordinate information as to the annotation corresponding to the consecutive picked-up images, the controller 101 removes the annotation from the difference extraction result (step S218). By carrying out the procedures of steps S214 through S218, the write information written directly on the object 14 or the table 15 can be extracted as an annotation, with the use of the write information written in the display area 210 of the display 205 or the pen of the UI 16 of the PC 2.

Lastly, the controller 101 outputs the information obtained by removing the annotation in step S218 (the write information as the annotation that is written directly on the object 14 or the table 15 with the use of the write information written in the display area 210 of the display 205 or the pen of the UI 16 of the PC 2), to the controller 301 via the transmission/reception unit 102, the network 5, and the transmission/reception unit 302 (step S218 step S208).

Using the write information written in the display area 210 of the display 205 or the pen of the UI 16 of the PC 2, the controller 301 draws the write information, which is written directly on the object 14 or the table 15, on the stroke drawing layer (step S208).

As described above, the controller 301 performs calibration. With the size of the image pick-up area of the table 15 including the object 14 (the image pick-up area of a picked-up image) being the same as the size of the display area 310, the controller 101 extracts write information, and the controller 301 draws the write information on the stroke drawing layer 36. Thus, the write information can be reflected at the corresponding portion of the display area 310.

Figure 15:
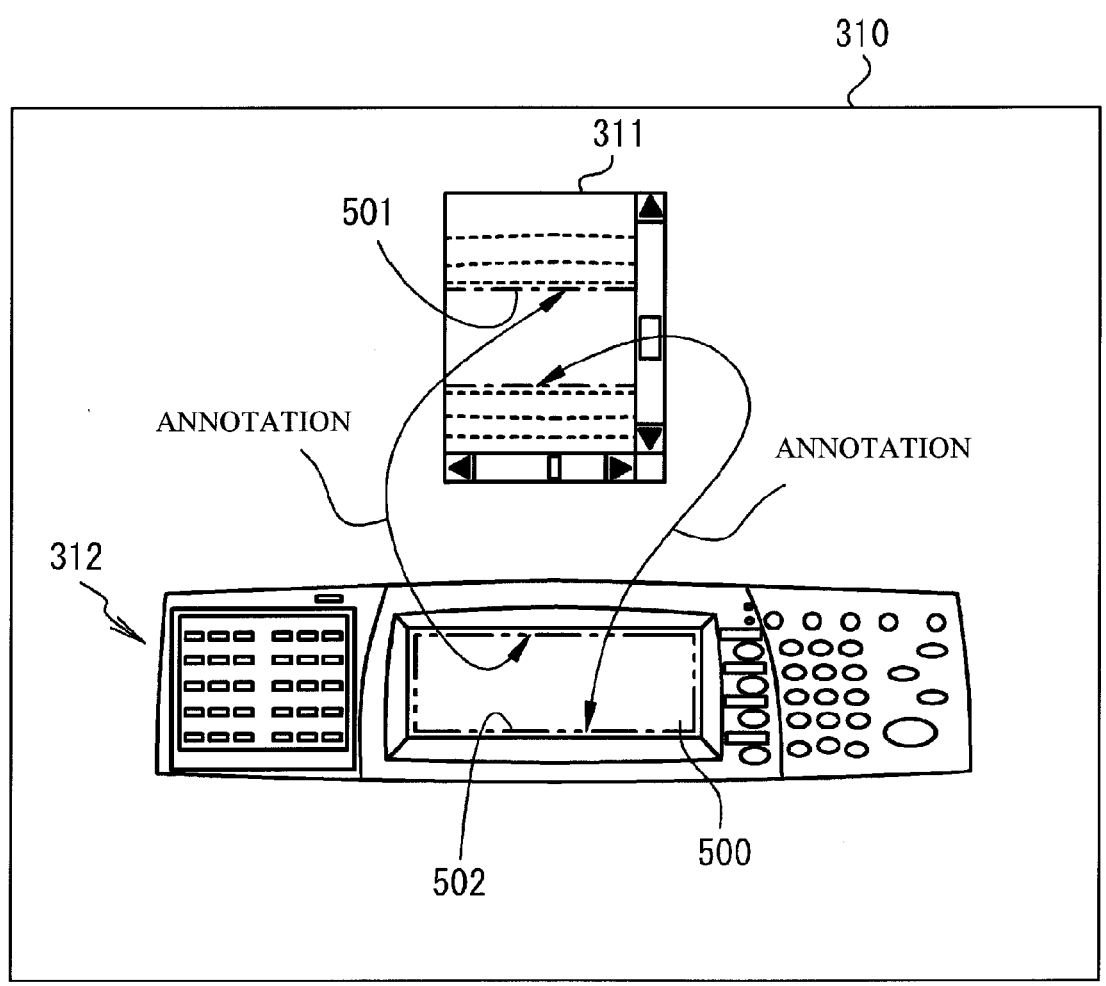
FIG. 15 shows an example case where the real view window is displayed on the same level as the drawing of the operation panel of the copying machine.

In the display area 310 after the calibration as shown in FIG. 13, the controller 301 may perform a setting operation so that the real view window 311 is displayed on the same level as the drawing of the operation panel of the copying machine written in the document area 312. FIG. 15 shows an example of the display area 310 after this setting. The dotted lines in the real view window 311 indicate a part of a picked-up image of the operation panel of the copying machine.

The controller 301 extracts the feature points of the drawing of the operation panel of the copying machine in the document area 312 (the document written on the document image layer 37) and the picked-up image displayed on the real view window 311. The controller 301 then performs matching between the extracted feature points, and connects matching feature points to each other with an annotation.

Accordingly, the user who views the display 305 of the PC 3 can readily grasp the correspondence in the relationship between the actual object displayed as a picked-up image (or the actual operation panel or the design drawing of the operation panel of the copying machine) and the document (the drawing of the operation panel of the copying machine in the document area 312).

As described above, the controller 301 controls the display 305 to display the real view window 311 in a visible fashion or in an invisible fashion. Accordingly, the real view window 311 can be made invisible. As a result, the user of the PC 3 can automatically project the annotation written in the real view window 311 on the projection area including the object, without becoming conscious of the existence of the real view window 311 displaying a picked-up image.

By performing calibration, the controller 301 matches the size of the image pick-up area of the video camera 11 and the size of the display area 310 of the display 305 with each other. The controller 101 detects the write information written on the object or in the projection area as an annotation, and outputs the annotation to the PC 3. With the image pick-up area of the video camera 11 being equal to the display area 310 of the display 305 in size, the display 305 displays the write information on the stroke drawing layer 36. Accordingly, the write information as an annotation written directly on the object or in the projection area can be reflected at the corresponding portion of the display 305.

The controller 101 further extracts the difference between consecutive images picked up by the video camera 11, and removes the annotation from the consecutive picked-up images from the extraction result. In this manner, the write information written on the object or in the projection area can be detected with high precision.

Fourth Exemplary Embodiment

Next, a fourth exemplary embodiment of the present invention is described, with reference to the accompanying drawings.

In this exemplary embodiment, a document written in the document image layer 37 is projected on a blank region on the table 15, so as not to overlap with the object 14.

Since the information sharing support system of this exemplary embedment has the same structure as the above-described information sharing support system 100, explanation of the structure of the information sharing support system of this exemplary embodiment is omitted here.

Figure 16:
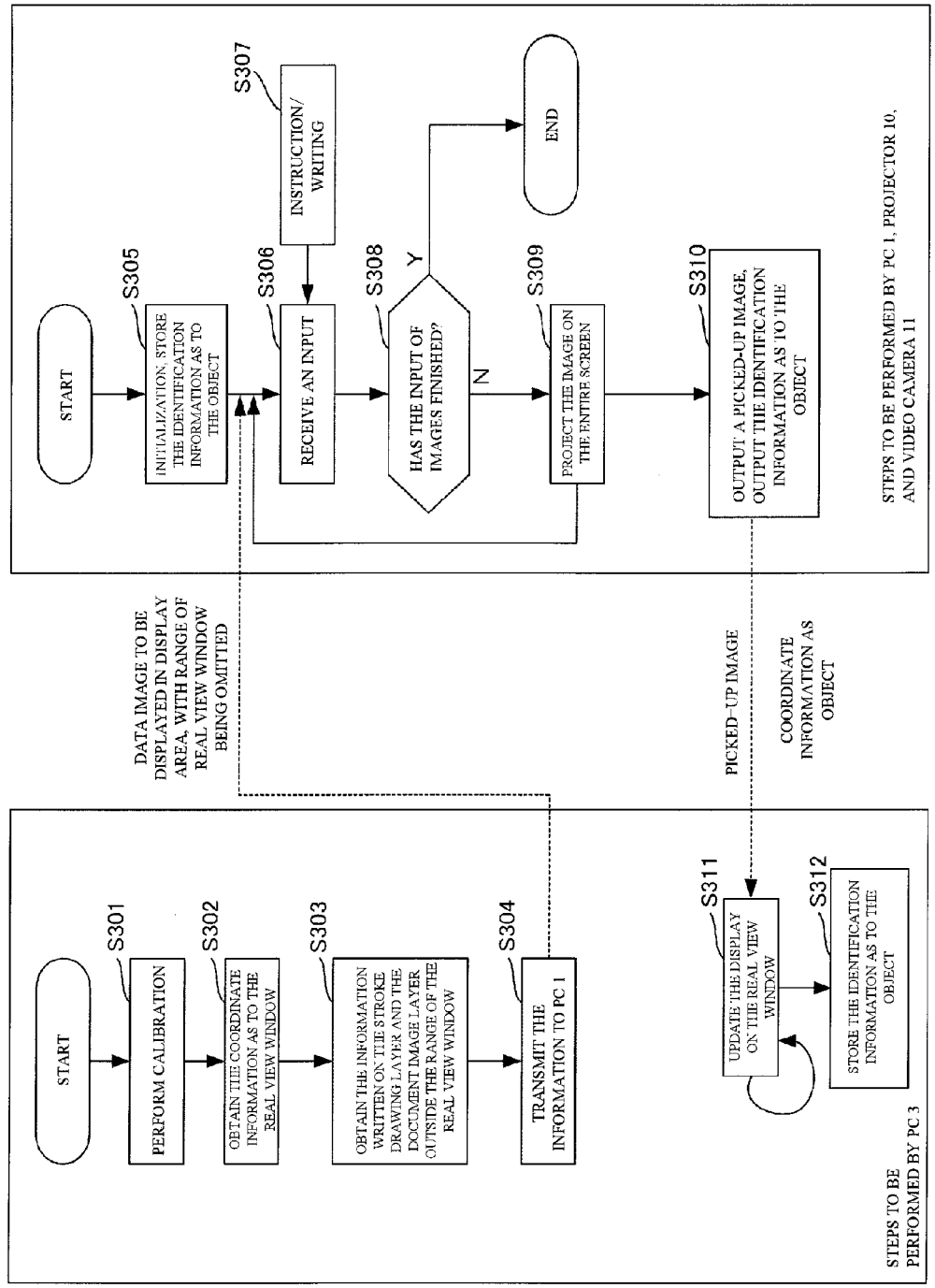
FIG. 16 is a flowchart showing the procedures for generating data to be displayed in the display area of a display in accordance with a fourth exemplary embodiment of the present invention.

FIG. 16 is a flowchart showing the procedures for generating the data to be displayed in the display area 310 of the display 305.

First, the controller 301 performs calibration of the real view window 311 (step S301). Since the calibration of the real view window 311 has already been described in the third exemplary embodiment, explanation of the calibration is omitted here. After the calibration, the image pick-up area of the table 15 including the object 14 (the image pick-up area of a picked-up image) becomes equal to the display area 310 in size.

The controller 301 then obtains the coordinate information as to the real view window 311 with respect to the picked-up image 30 (step S302), and also obtains the information (the annotation 38a and the subject document) written on the stroke drawing layer 36 and the document image layer 37 outside the range of the real view window 311 (step S303). The controller 301 transmits the information to the PC 1 via the transmission/reception unit 302 and the network 5 (step S304). To be specific, the information to be transmitted to the PC 1 is the data image to be displayed in the display area 310, without the region of the real view window 311 being omitted.

Next, the steps to be performed by the PC 1, the projector 10, and the video camera 11 are described.

First, the controller 101 of the PC 1 performs an initialization step, and stores in the memory 104 the identification information (such as an ID) as to the object 14 read by the input unit 105 (step S305). Here, the procedures in the initialization step include outputting a control command to the projector 10 and the video camera 11, performing a projection by the projector 10, and outputting an image picked up by the video camera 11. The procedures in step S305 are carried out independently of the procedures carried out on the PC 3 side.

The controller 101 then receives an input of the data image to be displayed in the display area 310, with the region of the real view window 311 being omitted, from the PC 3 via the network 5 and the transmission/reception unit 102 (step S306). Once the generation of the data starts, the controller 101 constantly receives an instruction or an event (an operation) such as writing from the PC 2 (step S307).

The controller 101 determines whether the input of the data image to be displayed in the display area 310 without the region of the real view window 311 has been finished (step S308).

If the result of the determination is "YES" in step S308, the data generating operation is ended. If the result of the determination is "NO" in step S308, the controller 101 controls the projector 10, using the control command and the data image to be displayed in the display area 310 without the region of the real view window 311. Accordingly, the projector 10 projects the image on the table 15 including the object 14 (S309). The video camera 11 outputs a picked-up image of the table 15 including the object 14 on which the annotation is projected, to the controller 301 of the PC 3 via the network 5 and the transmission/reception unit 302. The controller 101 outputs the identification information as to the object 14 stored in the memory 104, to the controller 301 of the PC 3 (step S310).

The controller 301 receives the picked-up image, and updates the display on the real view window 311 (step S311). Accordingly, the real view window 311 displays an annotation, together with the table 15 including the object 14. The updating of the display in step S311 is performed in a successive manner. The controller 301 also obtains the identification information as to the object 14 from the PC 1, and stores the identification information in the memory 304 (step S312).

As in the first exemplary embodiment, the controller 301 of this exemplary embodiment may extract the feature points of the documents (including characters, a drawing, or a still image) written on the document image layer 37 and the picked-up image displayed within the real view window 311. The controller 301 may then perform matching between the extracted feature points, and connect matching feature points to each other with an annotation. Here, the matching may not be performed by the above-described method of this exemplary embodiment, but may be performed by a known matching method such as the SIFT method.

Accordingly, the user who views the display 305 of the PC 3 can readily grasp the correspondence in the relationship between the actual object 14 displayed as a picked-up image and the document.

Upon receipt of a picked-up image from the video camera 11, the controller 301 may obtain the attribute information as to the projector 10 and the video camera 11 from the PC 1, and store the attribute information in the memory 304. Here, the attribute information includes the information as to the projecting position and the projection range of the projector 10, and the information as to the image picking position and the image pick-up range of the video camera 11.

When the controller 301 stores the data to be displayed in the display area 310 of the display 305 in the memory 304, an annotation (including coordinate information), a picked-up image within the real view window 311, and the main information as to the subject document are stored in the memory 304. At the same time, the attribute information (the positional information and range information) as to the real view window 311, the attribute information as to the document (including the document ID, the subject page number(s), the display range of the document, and the display position of the document), the attribute information as to the object (the identification information (ID) as to the object), and the attribute information as to the projector 10 and the video camera 11 (including the information as to the projecting position and the projection range of the projector 10, and the information as to the image picking position and the image pick-up range of the video camera 11) may be associated with the main information, and be stored in the memory 304.

With this arrangement, the controller 301 can retrieve the data to be displayed in the display area 310 of the display 305, based on the attribute information such as the identification information as to the object. The controller 301 can also perform a control operation so that the data stored in the memory 304 can be displayed in the display area 310 of the display 305.

As described above, in accordance with this exemplary embodiment, the controller 301 matches the size of the image pick-up area of the video camera 11 and the size of the display area 310 of the display 305 with each other. The controller 301 then transmits the annotation 38*a* drawn on the stroke drawing layer 36 and the document drawn on the document image layer 37 to the projector 10, so that the annotation 38*a* and the document can be projected on the projection area, and the same information (the annotation 38*a* and the document) can be displayed both in the projection area and the display area 310 of the display 305. Accordingly, the information can be shared between the user on the projection area side and the user of the PC 3.

A recording medium on which the software program for realizing the functions of the PCs 1 through 4 is recorded may be supplied to each PC, and the CPU of each PC may read and execute the program recorded on the recording medium. In this manner, the same effects as those of the above-described first through fourth exemplary embodiments can be achieved. The recording medium for providing the program may be a CD-ROM, a DVD, or an SD card, for example.

Alternatively, the CPU of each PC may execute a software program for realizing the functions of each PC, so as to achieve the same effects as those of the above-described first through fourth exemplary embodiments.

It should be noted that the present invention is not limited to those exemplary embodiments, and various modifications may be made to them without departing from the scope of the invention.

What is claimed is:

1. An information sharing support system comprising:
a first information processing device that is connected to a projector device for projecting an image on a projection area including an object therein, and to an image pick-up device for picking up an image of the projection area including the object, with the projected image being projected on the projection area;
a second information processing device connected over a network to the first information processing device, the second information processing device including:
an inputting unit that inputs an event in a first layer, inputs a second annotation image that is a part of a first annotation image associated with the event to a second layer, inputs a third annotation image that is the remaining part of the first annotation image to a third layer, and inputs a document to a fourth layer;
a transmitting unit that transmits the second annotation image to the projector device;
a receiving unit that receives a picked-up image of the projection area from the image pick-up device, the picked-up image including the second annotation image projected on the projection area by the projector device; and
a processing unit that allocates the picked-up image received by the receiving unit to the second layer to update the display of the second layer, and causes the picked-up image of the second layer, the third annotation image of the third layer and the document of the fourth layer to be displayed on a display in an overlapping fashion.

2. The information sharing support system according to claim 1, wherein:
one of the first information processing device and the second information processing device includes a converting unit that converts coordinate information of the second annotation image into coordinate information compatible with the projection area of the projector device; and
the transmitting unit transmits the coordinate information as to the second annotation image on the picked-up image to the converting unit, and the converting unit transmits the converted coordinate information to the projector device.

3. The information sharing support system according to claim 1, wherein the second information processing device includes an extracting unit that extracts feature points of the document drawn on the fourth layer and the picked-up image displayed on the second layer, a matching unit that performs matching between the extracted feature points, and a connecting unit that connects matching feature points to each other with an annotation image.

4. The information sharing support system according to claim 1, wherein the second information processing device includes:
an acquiring unit that acquires attribute information of the object, and attribute information of the image pick-up device and the projector device;
a memory that stores data to be displayed on the display, attribute information of the second layer, attribute information of the document, the attribute information of the object, and the attribute information of the image pick-up device and the projector device, the data and the sets of attribute information being associated with one another; and a retrieving unit that retrieves the data to be displayed on the display, based on at least one set of attribute information among the attribute information of the second layer, the attribute information of the document, the attribute information of the object, and the attribute information of the image pick-up device and the projector device.

5. The information sharing support system according to claim 1, wherein the second information processing device includes a setting unit that puts the second layer into a visible or invisible state on the display.

6. The information sharing support system according to claim 1, wherein:

the second information processing device includes a size matching unit that matches an image pick-up area of the image pick-up device and a display area of the display with each other in size;

the first information processing device includes a detecting unit that detects write information written on the object or the projection area as the third annotation image, and an outputting unit that outputs the write information detected as the third annotation image by the detecting unit to the second information processing device; and the display displays the write information on the third layer, with the image pick-up area of the image pick-up device and the display area of the display being matched with each other in size by the size matching unit.

7. The information sharing support system according to claim 6, wherein the detecting unit extracts the difference between consecutive picked-up images picked up by the image pick-up device, and removes the second annotation image contained in the consecutive picked-up images from the extraction result, so of detect the write information written on the object or the projection area.

8. The information sharing support system according to claim 1, wherein:

the second information processing device includes a size matching unit that matches an image pick-up area of the image pick-up device and a display area of the display with each other in size; and the transmitting unit transmits the third annotation image drawn on the third layer and the document drawn on the fourth layer to the projector device, with the image pick-up area of the image pick-up device and the display area of the display being matched with each other in size by the size matching unit.

9. An information sharing support system comprising:

a first information processing device that is connected to a projector device for projecting an image on a projection area including an object, and to an image pick-up device for picking up an image of the projection area including the object, with the projected image being projected on the projection area;

a second information processing device connected over a network to the first information processing device, the second information processing device including:

an inputting unit that inputs an operation of drawing a first annotation image to a first layer, inputs a second annotation image that is a part of the first annotation image to a second layer, inputs a third annotation image that is the remaining part of the first annotation image to a third layer, and inputs a document to a fourth layer;

an attaching unit that selects a part of the document as a partial image, and attaches the partial image onto the second layer; and a transmitting unit that transmits the partial image attached onto the second layer and coordinate information of the partial image to the projector device, the projector device projecting the partial image on the projection area including the object, based on the coordinate information of the partial image.

10. The information sharing support system according to claim 9, wherein the second information processing device includes:

a receiving unit that receives the picked-up image of the projection area from the image pick-up device, with the partial image being projected on the projection area by the projector device; and a processing unit that allocates the picked-up image received by the receiving unit to the second layer to update the display of the second layer, and causes the picked-up image of the second layer, the third annotation image of the third layer, and the document of the fourth layer to be displayed on a display in an overlapping fashion.

11. The information sharing support system according to claim 10, wherein the second information processing device includes an extracting unit that extracts feature points of the partial image and the picked-up image displayed on the second layer, a matching unit that performs matching between the extracted feature points, and a correcting unit that corrects the position of the partial image so that matching feature points overlap with each other.

12. The information sharing support system according to claim 10, wherein:

the second information processing device includes an extracting unit that extracts feature points of the partial image and the picked-up image displayed on the second layer, a matching unit that performs matching between the extracted feature points, and a connecting unit that connects matching feature points to each other with an annotation image:

the transmitting unit transmits the partial image, the coordinate information of the partial image, and coordinate information of the annotation image to the projector device; and the projector device projects the partial image and the annotation image on the projection area including the object, based on the coordinate information of the partial image and the annotation image.

13. An information processing device that is connected to an external device via a communication network, said external device being connected to a projector device for projecting an image on a projection area including an object, and to an image pick-up device for picking up an image of the projection area including the object projected thereon, the information processing device comprising:

an inputting unit that inputs an operation of drawing a first annotation image to a first layer, inputs a second annotation image that is a part of the first annotation image to a second layer, inputs a third annotation image that is the remaining part of the first annotation image to a third layer, and inputs a document to a fourth layer;

a transmitting unit that transmits the second annotation image to the projector device;

a receiving unit that receives the picked-up image of the projection area from the image pick-up device, the second annotation image being projected by the projector device on the projection area; and a processing unit that allocates the picked-up image received by the receiving unit to the second layer to update the display of the second layer, and causes the picked-up image of the second layer, the third annotation image of the third layer, and the document of the fourth layer to be displayed on a display in an overlapping fashion.

14. An information processing device that is connected to an external device via a communication network, said external device being connected to a projector device for projecting an image on a projection area including an object, and to an image pick-up device for picking up an image of the projection area including the object projected thereon, the information processing device comprising:

an inputting unit that inputs an operation of drawing a first annotation image to a first layer, inputs a second annotation image that is a part of the first annotation image to a second layer, inputs a third annotation image that is the remaining part of the first annotation image to a third layer, and inputs a document to a fourth layer;

an attaching unit that selects a part of the document as a partial image, and attaches the partial image onto the second layer; and a transmitting unit that transmits the partial image attached onto the second layer and coordinate information of the partial image to the projector device, the projector device projecting the partial image on the projection area including the object, based on the coordinate information of the partial image.

15. A recording medium storing a program which is executed by a computer that is connected to an external device via a communication network, said external device being connected to a projector device for projecting an image on a projection area including an object, and to an image pick-up device for picking up an image of the projection area including the object projected thereon, the program causing the computer to execute a process comprising:

inputting an operation of drawing a first annotation image to a first layer, inputting a second annotation image that is a part of the first annotation image to a second layer, inputting a third annotation image that is the remaining part of the first annotation image to a third layer, and inputting a document to a fourth layer;

transmitting the second annotation image to the projector device;

receiving the picked-up image of the projection area from the image pick-up device, the second annotation image being projected by the projector device on the projection area; and allocating the received picked-up image to the second layer to update the display of the second layer, and causing the picked-up image of the second layer, the third annotation image of the third layer, and the document of the fourth layer to be displayed on a display in an overlapping fashion.

16. A recording medium storing a program which is executed by a computer that is connected to an external device via a communication network, said external device being connected to a projector device for projecting an image on a projection area including an object, and to an image pick-up device for picking up an image of the projection area including the object projected thereon, the program causing the computer to execute a process comprising:

inputting an operation of drawing a first annotation image to a first layer, inputting a second annotation image that is a part of the first annotation image to a second layer, inputting a third annotation image that is the remaining part of the first annotation image to a third layer, and inputting a document to a fourth layer;

selecting a part of the document as a partial image, and attaching the partial image onto the second layer; and transmitting the partial image attached onto the second layer and coordinate information of the partial image to the projector device, the projector device projecting the partial image on the projection area including the object, based on the coordinate information of the partial image.

17. A method of controlling a computer that is connected to an external device via a communication network, said external device being connected to a projector device for projecting an image on a projection area including an object, and to an image pick-up device for picking up an image of the projection area including the object projected thereon, the method performed by the computer comprising:

inputting an operation of drawing a first annotation image to a first layer, inputting a second annotation image that is a part of the first annotation image to a second layer, inputting a third annotation image that is the remaining part of the first annotation image to a third layer, and inputting a document to a fourth layer;

transmitting the second annotation image to a projector device;

receiving the picked-up image of the projection area from the image pick-up device, the second annotation image being projected by the projector device on the projection area; and allocating the received, picked-up image to the second layer, and displaying the third annotation image of the third layer and the document of the fourth layer in an overlapping fashion.

18. A method of controlling a computer that is connected to an external device via a communication network, said external device being connected to a projector device for projecting an image on a projection area including an object, and to an image pick-up device for picking up an image of the projection area including the object thereon, the method performed by the computer comprising:

inputting an operation of drawing a first annotation image to a first layer, inputting a second annotation image that is a part of the first annotation image to a second layer, inputting a third annotation image that is the remaining part of the first annotation image to a third layer, and inputting a document to a fourth layer;

selecting a part of the document as a partial image, and attaching the partial image onto the second layer; and transmitting the partial image attached onto the second layer and coordinate information of the partial image to the projector device, the projector device projecting the partial image on the projection area including the object, based on the coordinate information of the partial image.

* * * * *